(12) United States Patent
Son

(10) Patent No.: US 11,252,782 B2
(45) Date of Patent: Feb. 15, 2022

(54) METHOD AND APPARATUS TO RECEIVE AND TRANSMIT DATA IN A MOBILE COMMUNICATION SYSTEM USING A MEDIUM ACCESS CONTROL SUBHEADER

(71) Applicant: Yeongmoon Son, Yongin-si (KR)

(72) Inventor: Yeongmoon Son, Yongin-si (KR)

(*) Notice: Subject to any disclaimer, the term of this patent is extended or adjusted under 35 U.S.C. 154(b) by 324 days.

(21) Appl. No.: 16/274,885

(22) Filed: Feb. 13, 2019

(65) Prior Publication Data
US 2019/0254114 A1  Aug. 15, 2019

Related U.S. Application Data

(60) Provisional application No. 62/629,702, filed on Feb. 13, 2018.

(51) Int. Cl.
| | |
|---|---|
| *H04W 80/02* | (2009.01) |
| *H04W 76/27* | (2018.01) |
| *H04W 76/11* | (2018.01) |
| *H04W 16/28* | (2009.01) |
| *H04W 72/14* | (2009.01) |
| *H04L 5/00* | (2006.01) |
| *H04W 74/08* | (2009.01) |

(52) U.S. Cl.
CPC .......... *H04W 80/02* (2013.01); *H04L 5/0098* (2013.01); *H04W 16/28* (2013.01); *H04W 72/14* (2013.01); *H04W 74/0833* (2013.01); *H04W 76/11* (2018.02); *H04W 76/27* (2018.02)

(58) Field of Classification Search
CPC ..... H04W 80/02; H04W 76/27; H04W 76/11; H04W 16/28; H04W 72/14; H04W 74/0833; H04W 76/19; H04W 76/10; H04L 5/0098; H04L 5/001
See application file for complete search history.

(56) References Cited

U.S. PATENT DOCUMENTS

| | | | |
|---|---|---|---|
| 2017/0195464 A1* | 7/2017 | Lee | H04W 52/365 |
| 2019/0246421 A1* | 8/2019 | Zhou | H04L 5/0048 |
| 2020/0045577 A1* | 2/2020 | Yu | H04W 28/0252 |
| 2020/0137776 A1* | 4/2020 | Lee | H04W 48/14 |

OTHER PUBLICATIONS

3GPP TS 38.321 V15.0.0 (Dec. 2017); Technical Specification; 3rd Generation Partnership Project; Technical Specification Group Radio Access Network; NR; Medium Access Control (MAC) protocol specification; (Release 15). (Year: 2017).*

* cited by examiner

*Primary Examiner* — Justin T Van Roie
(74) *Attorney, Agent, or Firm* — Novick, Kim & Lee, PLLC; Sang Ho Lee; Hyun Woo Shin

(57) ABSTRACT

Data transfer method and apparatus for use in a mobile communication system are provided. Method to transmit and receive common control channel message includes generating MAC subPDU for common control channel message with $1^{st}$ type subheader, transmitting MAC PDU including the MAC subPDU to the network, receiving MAC PDU including MAC subPDU for common control channel message with $2^{nd}$ type subheader from the network and processing the received MAC subPDU applying the $2^{nd}$ type subheader.

2 Claims, 15 Drawing Sheets

METHOD AND APPARATUS TO RECEIVE AND TRANSMIT DATA IN A MOBILE COMMUNICATION SYSTEM USING A MEDIUM ACCESS CONTROL SUBHEADER

CROSS-REFERENCE TO RELATED APPLICATION

This application claims the priority and benefit of U.S. Provisional Patent Application No. 62/629,702, filed Feb. 13, 2018, the disclosure of which is incorporated herein by reference.

BACKGROUND OF THE INVENTION

1. Field of the Invention

The present disclosure relates to a mobile communication system. More specifically, the present disclosure relates to a method to transmit and receive common control channel message with proper subheader.

2. Description of the Related Art

Mobile communication systems were developed to provide mobile users with communication services. With rapid technological advancements, the mobile communication systems have evolved to the level capable of providing high speed data communication service to support various QoS requirements.

In the mobile communication system called NR (Next Radio) which is being developed, to support various QoS requirement in various deployment scenarios, efficient way to perform various RRC procedures is required. Common control channel message is used in uplink and in downlink for various purpose like RRC connection setup, RRC connection reestablishment and RRC connection resumption. Common control channel message is transmitted during random access procedure where transmission resource is limited. Hence it is required to minimize the overhead in performing RRC procedures involving common control channel message exchange.

SUMMARY

Aspects of the present disclosure are to address at least the above mentioned problems. Accordingly, an aspect of the present disclosure is to provide a method and an apparatus to transmit and receive common control channel message with minimum overhead.

In accordance with an aspect of the present disclosure, a method to transmit and receive common control channel message is provided. In the method, UE applies a $1^{st}$ method to generate MAC subPDU including CCCH SDU and applies $2^{nd}$ method to process the received MAC subPDU including CCCH SDU. In the first method the length of CCCH SDU is indicated by LCID field and in the $2^{nd}$ method the length of CCCH SDU is indicated by L field.

DETAILED DESCRIPTION

Figure 1A:
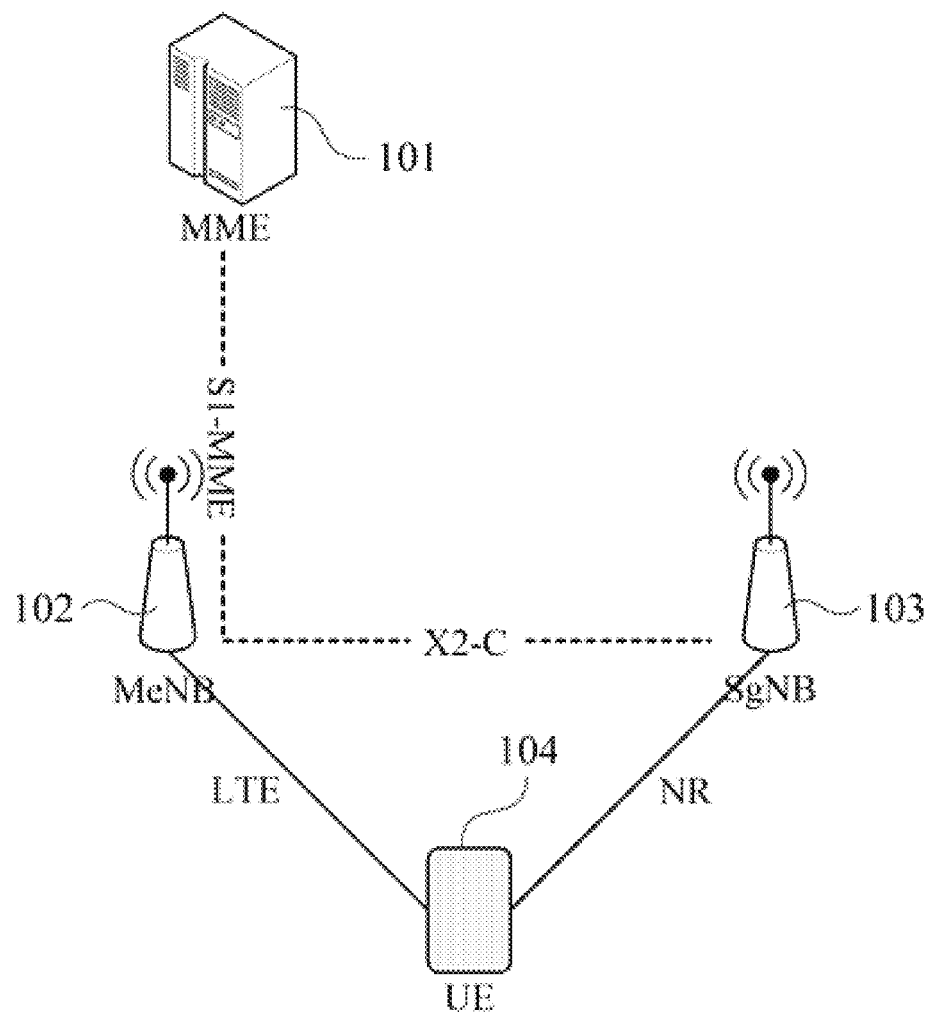
FIGS. 1A and 1B are diagrams illustrating a mobile communication system architecture according to various embodiments of the present disclosure.

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices devised so as to perform the same function regardless of a structure.

Therefore, it is to be understood that, for example, a block diagram of the present specification shows a conceptual aspect of an illustrative circuit for embodying a principle of the present invention. Similarly, it is to be understood that all flowcharts, state transition views, pseudo-codes, and the like show various processes that may tangibly embodied in a computer-readable medium and that are executed by computers or processors regardless of whether or the computers or the processors are clearly illustrated.

Functions of various devices including processors or functional blocks represented as concepts similar to the processors and illustrated in the accompanying drawings may be provided by hardware having capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make unclear the gist of the present invention, it will be omitted.

Hereinafter, various exemplary embodiments of the present invention will be described in detail with reference to the accompanying drawings.

The following description with reference to the accompanying drawings is provided to assist in a comprehensive understanding of various embodiments of the present disclosures as defined by the claims and their equivalents.

Terminologies used in the disclosures are explained below. Numerology defines a specific time duration e.g. the length of an OFDM symbol. Numerology and subcarrier spacing (hereafter SCS) have one to one relationship. In LTE, SCS is 15 KHz and the length of an OFDM symbol is $\frac{1}{14}$ ms. In NR, SCS is either 15 KHz, 30 KHz, 60 KHz, 120 KHz or 240 KHz. The length of an OFDM symbol is inverse proportional to SCS. SCS, numerology and symbol length are corresponding each other and interchangeable in the disclosures. Subframe is time unit with 1 ms duration. Time slot (or slot) is time unit consisting with N symbols. N is either 7 or 14. Frame structure has same meaning as duplex mode. FS1 is FDD and FS2 is TDD.

Figure 1B:
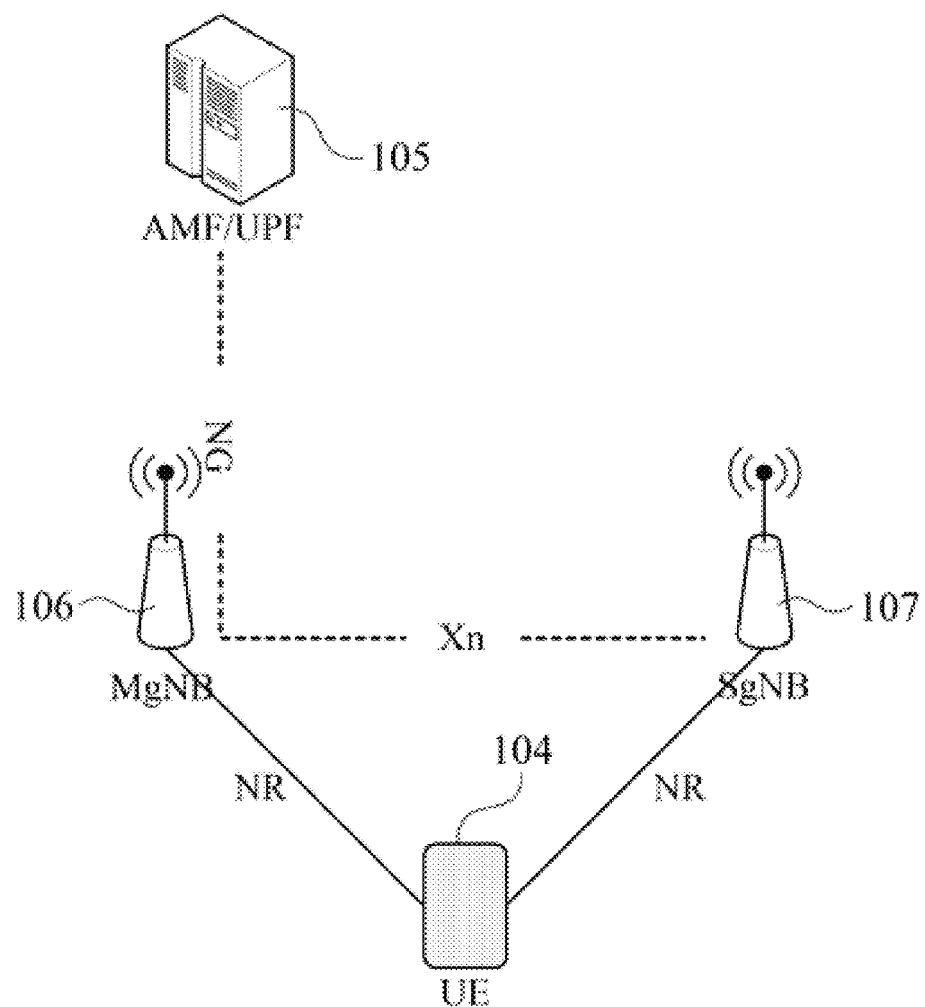

FIGS. 1A and 1B are diagrams illustrating a mobile communication system architecture according to various embodiments of the present disclosure.

Referring to FIGS. 1A and 1B, MME 101 is connected to MeNB 102 via S1 interface. SgNB 103 is connected to MeNB 102 via X2 interface. UE 104 is connected to MeNB 102 and SgNB 103 via a specific radio interface/RAT. UE transmit and receive data with MeNB via a group of cells. The RAT of those cells is LTE/E-UTRA. The group of cells used for communication with MeNB is the 1st cell group (or Master Cell Group). UE transmit and receive data with SgNB via another group of cells. The RAT of those cells is NR. The group of cells used for communication with SgNB is the 2nd cell group (or Secondary Cell Group).

The mobile communication system explained above is called EN-DC (LTE NR Dual Connectivity). It is possible that UE is connected to only NR cells. AMF/UPF 105 is connected with MgNB 106 or with gNB via NG interface. The interface between gNBs is called Xn.

Referring to FIGS. 1A and 1B, base station is illustrated as a single node. In the real implementation, base station can be comprised of plurality of nodes. For example, a central unit and plurality of distributed unit can be comprised of a single base station and plurality of cells controlled by the base station.

Figure 2:
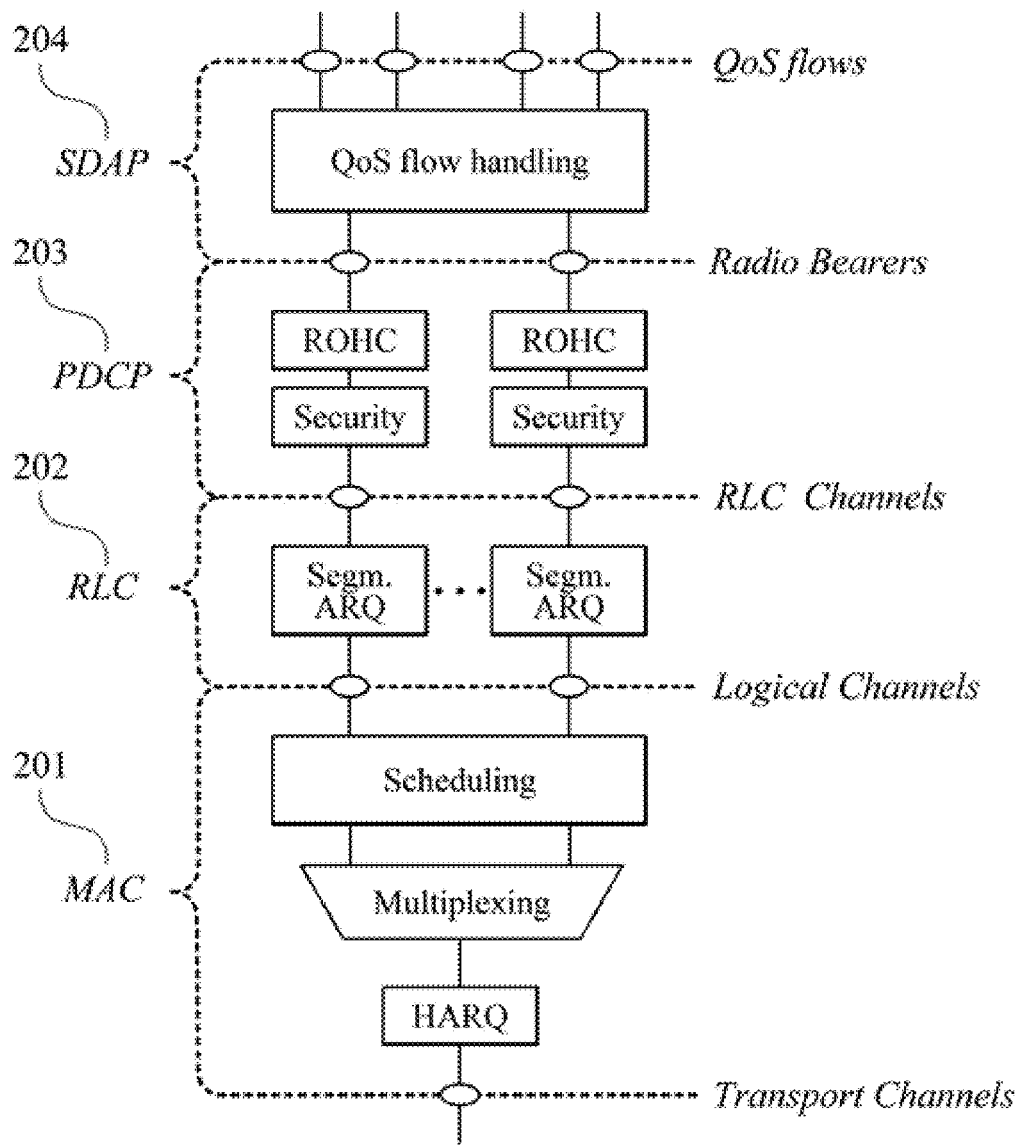
FIG. 2 is a diagram illustrating a protocol stack of a mobile communication system according to various embodiments of the present disclosure.

FIG. 2 is a diagram illustrating a protocol stack of a mobile communication system according to various embodiments of the present disclosure.

Referring to FIG. 2, Protocol stack of UE and base station is comprised of MAC 201, RLC 202, PDCP 203, SDAP 204. Multiple QoS flow/IP packet flows input to SDAP which distribute the IP packet to the appropriate PDCP. The RRC control message between UE and base station is exchanged via SRB (Signaling Radio Bearer). User data/IP packet between UE and base station is exchanged via DRB (Data Radio Bearer). Radio bearer is comprised of PDCP and RLC.

SDAP (Service Data Adaptation Protocol) layer handles QoS per data/service. More specifically, SDAP distribute IP packet received from the upper layer to the appropriate DRB. SDAP inspects SDAP header of the received SDAP PDU to apply reflective QoS. More details on reflective QoS can be found in TS 38.300.

PDCP (Packet Data Convergence Protocol) layer performs header compression/decompression, ciphering/deciphering and integrity protection. PDCP provides temporary lossless data transfer for the case where RLC cannot guarantee lossless data transfer.

RLC (Radio Link Control) layer process the RLC SDU received from PDCP to make the RLC PDU and submit it to the MAC layer. RLC layer performs ARQ (Automatic Retransmission Request) for RLC SDUs to ensure lossless data transfer.

MAC (Medium Access Control) layer multiplexes RLC PDUs, generated by multiple radio bearers configured in the UE, into MAC PDU and submit it to the physical layer. MAC layer demultiplexes RLC PDUs from MAC PDU and forward them to appropriate RLC entity. MAC performs specific operations required for data transfer with base station like random access or uplink timing adjustment.

Figure 3:
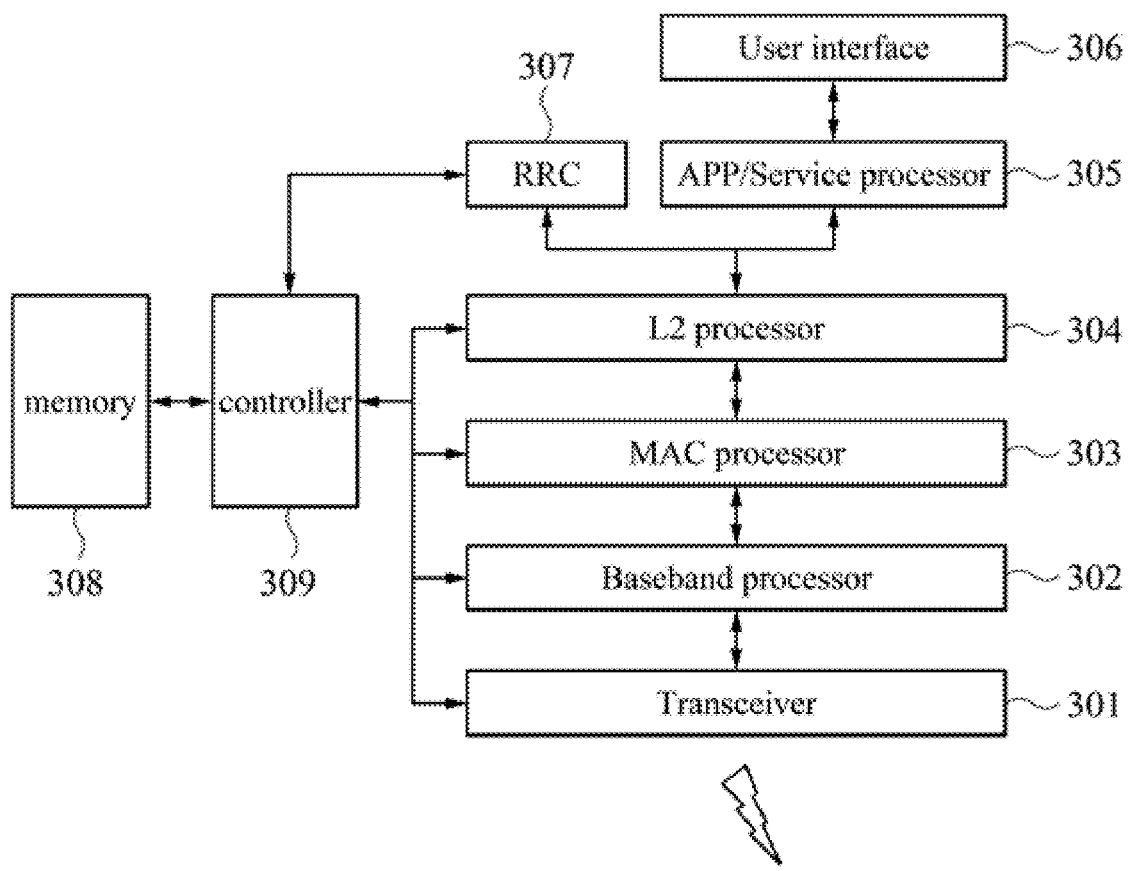
FIG. 3 is a block diagram illustrating a configuration of a terminal according to various embodiments of the present disclosure.

FIG. 3 is a block diagram illustrating a configuration of a terminal according to various embodiments of the present disclosure.

UE consists of transceiver 301, baseband processor 302, MAC processer 303, Layer 2 processor 304, Application/service processor 305, user interface 306, RRC processor 307, memory 308 and controller 309.

Transceiver process the signal received from baseband processor for transmission or process the received signal and forward it to baseband processor.

Baseband processor process (e.g. scrambling, channel coding, modulation etc) bit stream received from MAC processor to send it to transceiver or process the received signal from the transceiver to forward it to MAC processor.

MAC processor multiplex RLC PDUs from L2 processor into MAC PDU or demultiplex MAC PDU to RLC PDUs to forward them to L2 processor. MAC processor forward MAC control element to controller or multiplex MAC control element into MAC PDU.

L2 processor consists of RLC processor and PDCP processor. L2 processor process RRC message from RRC processor into RLC PDU and process IP packet from application/service processor into RLC PDU, or vice versa.

Application/service processor processes the input from user interface and generate and forward IP packets to L2 processor for transmission. Application/service processor processes IP packets received from L2 processor and forward relevant to user interface.

User interface consist of display, virtual key board, speaker and microphone, and interact with user.

Memory stores necessary information forwarded from the controller and deliver necessary information to controller based on controller's instruction.

Controller controls the mobile communication in general. UE behavior/operation depicted in the FIGS. 5, 6A, 6B, 7A, 7B and 8A~8D are controlled by controller.

Figure 4:
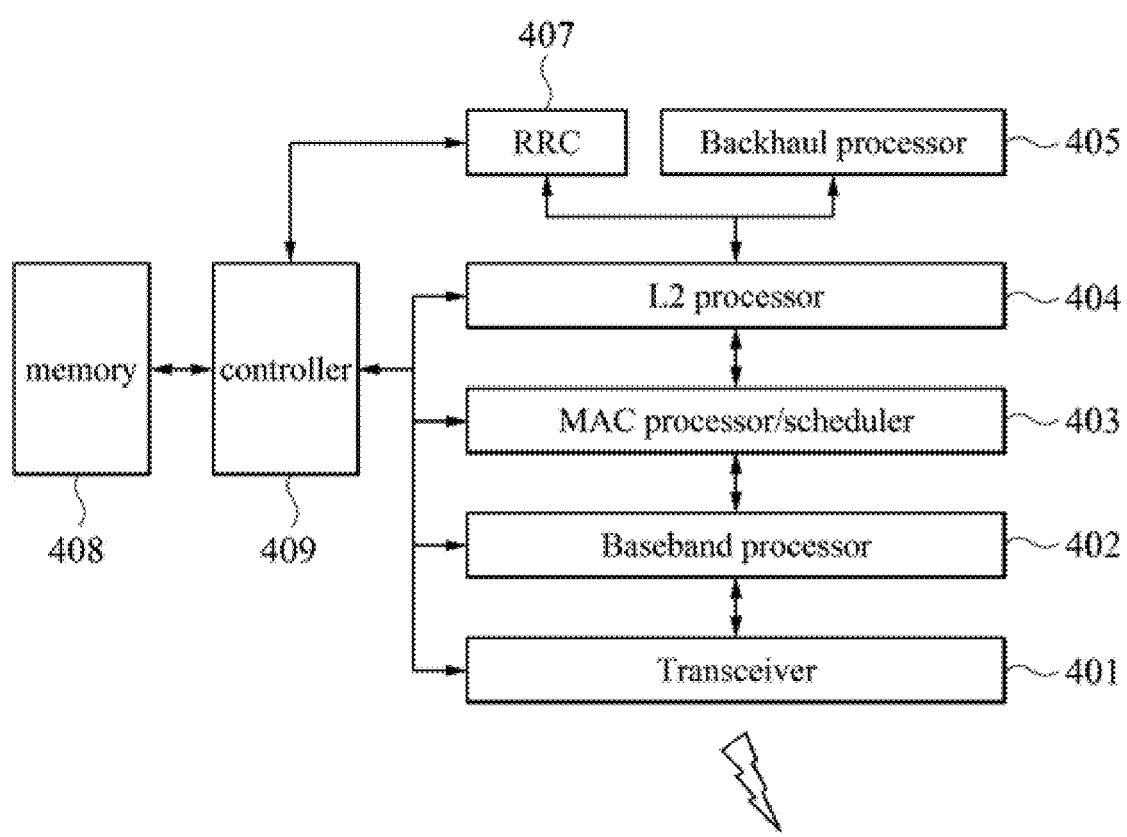
FIG. 4 is a block diagram illustrating a configuration of a base station according to various embodiments of the present disclosure.

FIG. 4 is a block diagram illustrating a configuration of a base station according to various embodiments of the present disclosure.

Node B consists of transceiver 401, baseband processor 402 MAC processor/scheduler 403, Layer 2 processor 404, backhaul processor 405, RRC processor 407, memory 408 and controller 409.

Transceiver process the signal received from baseband processor for transmission or process the received signal to forward it to baseband processor.

Baseband processor process (e.g. scrambling, channel coding, modulation etc) bit stream received from MAC processor to send it to transceiver or process the received the signal from the transceiver to forward it to MAC processor.

MAC processor multiplex RLC PDUs from L2 processor into MAC PDU or demultiplex MAC PDU to RLC PDUs to forward them to L2 processor. It forward MAC control element to controller or multiplex MAC control element into MAC PDU.

Scheduler allocate resource to UEs in the cells controlled by the scheduler.

L2 processor consists of RLC processor and PDCP processor. L2 processor process RRC message from RRC processor into RLC PDU and process IP packet from backhaul processor into RLC PDU, or vice versa.

Backhaul processor communicate with core network node.

Memory stores necessary information forwarded from the controller and deliver necessary information to controller based on controller's instruction.

Controller controls the mobile communication in general. Node B behavior/operation depicted or implied in the FIGS. 5, 6A, 6B, 7A, 7B and 8A~8D are controlled by controller are controlled by controller.

1$^{st}$ Embodiment

GNB and UE exchange RRC messages for radio resource control. RRC message is either CCCH (Common Control Channel) message or DCCH (Dedicate Control Channel) message. CCCH message is used when RRC connection needs to be established, reestablished or resumed. Once RRC connection is being available, DCCH messages are used.

To exchange RRC message, CCCH message or DCCH message is included in a MAC subPDU which is included in a MAC PDU which is transmitted over the NR air interface. CCCH message is usually transmitted within size limited MAC PDU while DCCH message is not. In the disclosure, a method and an apparatus are provided to transmit and receive the RRC message by applying appropriate MAC subheader.

Figure 5:
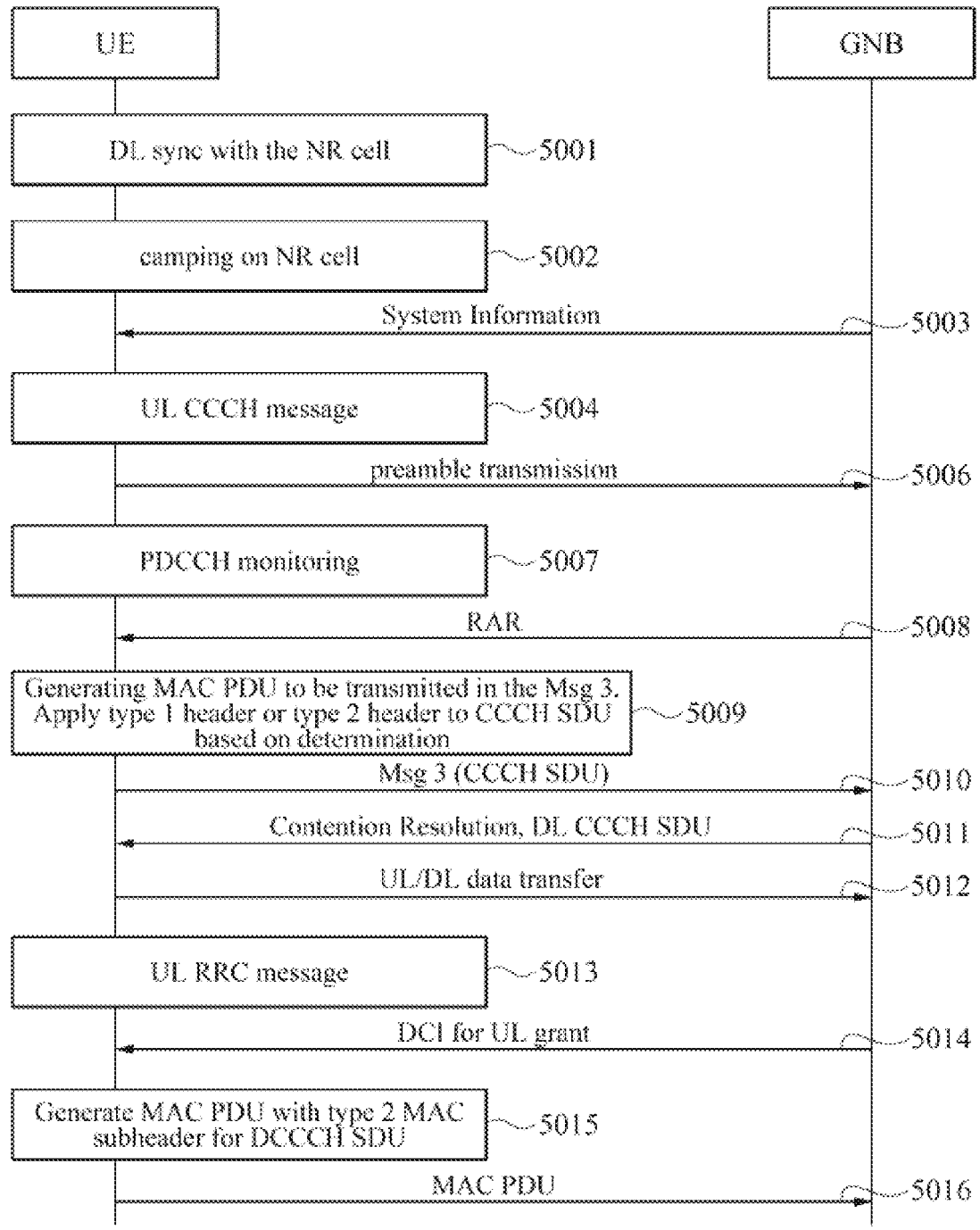
FIG. 5 is a flowchart illustrating transmitting and receiving RRC message using MAC PDU.

FIG. 5 is a flowchart illustrating transmitting and receiving RRC message using MAC PDU.

UE performs downlink synchronization with a NR cell 5001. UE receives the primary synchronization signal (PSS) and secondary synchronization signal (SSS) to acquire time and frequency synchronization with a cell and to detect the physical layer Cell ID of that cell.

UE camps on the NR cell if a specific condition is fulfilled 5002. The condition includes whether the RSRP/RSRQ of PSS/SSS is above a certain threshold or better than that of the serving cell. Once UE camp on the NR cell, the NR cell becomes UE's serving cell.

UE receives system information from the NR cell 5003. System Information (SI) includes information required for random access procedure (RACH configuration information). RACH configuration information includes following information.

NumberofRA-Preambles, which indicates the number of common preambles that UE can randomly selects.

PRACH resource index, which indicates PRACH resource where UE can transmit preamble.

UL CCCH (Uplink Common Control Channel) RRC message occurs in the UE 5004. The UL CCCH RRC message is either to establish RRC connection (RRCRequest), to reestablish RRC connection (RRCReestablishment) or to resume RRC connection (RRCResumeRequest). To transmit UL CCCH RRC message, UE triggers random access procedure. In this disclosure, RRCRequest and RRCReestablishmentRequest are classified as type 1 UL CCCH SDU, and RRCResumeRequest as type 2 UL CCCH SDU. The size of type 1 CCCH SDU is x bit and the size of type 2 CCCH SDU is y bit (y>x, x and y are fixed in the specification).

UE selects preamble and PRACH resource to perform random access procedure and transmit the preamble on the selected PRACH resource 5006.

After transmitting preamble, UE monitors PDCCH 5007 to receive RAR with RA-RNTI that was calculated in relation with PRACH frequency/time resource where the preamble was/is transmitted. When UE receives a MAC PDU including the RAPID corresponding to the preamble that UE has transmitted, UE consider valid RAR is received.

UE receives valid RAR from the network 5008. RAR includes following information.

Timing Advance Command: The Timing Advance Command field indicates the index value TA used to control the amount of timing adjustment that the MAC entity has to apply;

UL Grant: The Uplink Grant field indicates the resources to be used on the uplink transmission.

Temporary C-RNTI: The Temporary C-RNTI field indicates the temporary identity that is used by the MAC entity during Random Access. The size of the Temporary C-RNTI field is 16 bits.

UE generates MAC PDU to be transmitted in the Msg 3 5009. The MAC PDU includes MAC subPDU for CCCH SDU. If CCCH SDU is 1st type, UE uses 1st MAC subheader (without L field). If CCCH SDU is 2nd type, UE uses 2nd MAC subheader (with L field). UE includes the MAC subPDU in the front of the MAC PDU.

2nd type MAC subheader consists of LCID field, F field and L field. 1st type MAC subheader consists of LCID field.

The length of MAC SDU with 1$^{st}$ type MAC subheader is predetermined and known to both transmitter and receiver. In the MAC subheader, LCID indicates whether the corresponding MAC SDU is CCCH SDU or not. A specific LCID (e.g. b000000) is applied to indicate the 1st type CCCH SDU and a specific LCID (e.g. b100001) different from the LCID for 1st type CCCH SDU is applied to indicate the 2nd type CCCH SDU.

UE transmits Msg 3 in the UL BWP indicated by the UL grant in RAR 5010. Msg 3 contains MAC PDU generated in 5009.

UE receives MAC PDU containing MAC subPDU containing Contention Resolution and MAC subPDU containing DL CCCH 5011. Contention Resolution message is a (part of) UL CCCH SDU transmitted in the Msg 3. MAC subheader of DL CCCH SDU is 2nd type MAC subheader. Contention Resolution message includes the RRC connection request message transmitted in the Msg 3. UE determines contention resolution is successful when the received downlink message include the RRC connection message it has transmitted.

UE performs Signaling/Data transfer with the GNB via established/resumed SRB/DRB 5012.

UL RRC message is generated 5013. For example, if measurement event occurs, a measurement report is triggered, and the corresponding UL RRC message is generated. UE performs necessary actions (e.g. sending scheduling request) to transmit the UL RRC message.

UE receives UL grant for new transmission from GNB 5014.

UE generates MAC PDU to be transmitted on the UL resource granted in the UL grant 5015. UE generates MAC subPDU for DCCH SDU. 2nd MAC subheader is used for DCCH SDU.

UE transmits MAC PDU in the UL resource indicated in the UL grant 5016.

Figure 6A:
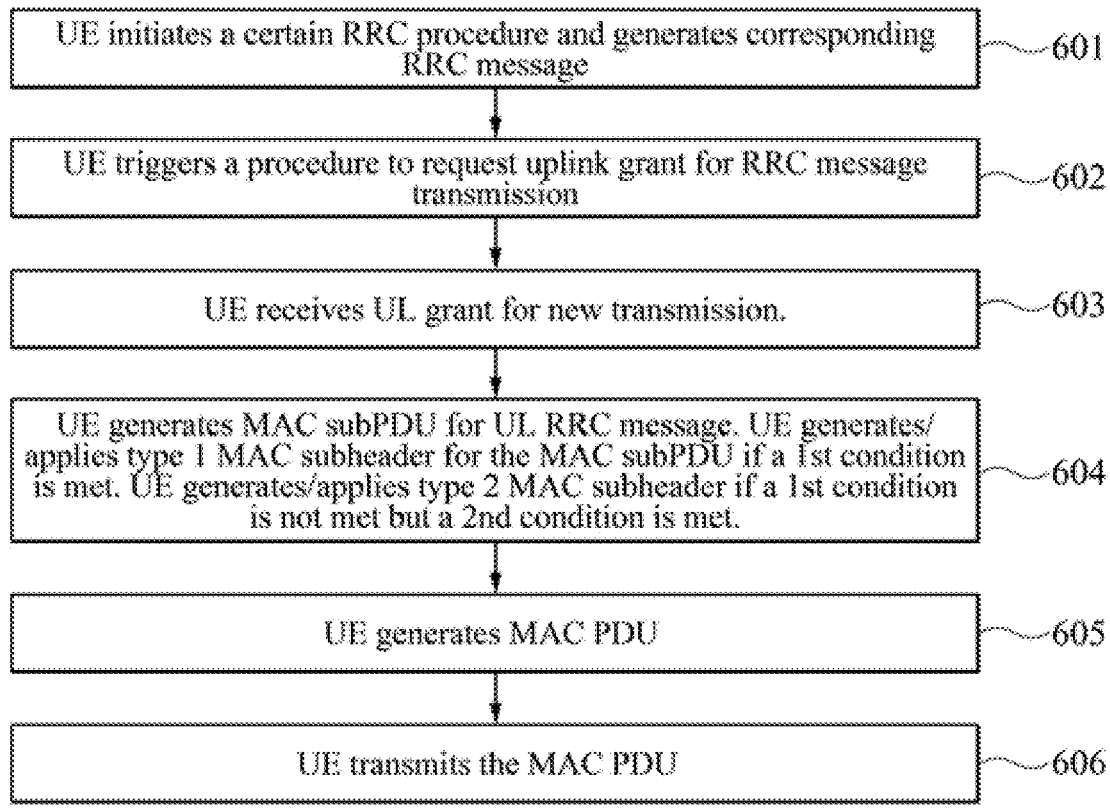
FIG. 6A is a flowchart illustrating UE operation of transmitting and receiving RRC message.

FIG. 6A is a flowchart illustrating UE operation of transmitting and receiving RRC message.

UE initiates a certain RRC procedure and generates corresponding RRC message 601.

UE triggers a procedure to request uplink grant for RRC message transmission (e.g. scheduling request or random access) 602.

UE receives UL grant for new transmission 603. The UL grant is received either by RAR or by DCI on PDCCH.

UE generates MAC subPDU for UL RRC message 604. MAC subPDU contains a complete or a part of UL RRC message in the associated MAC SDU. UE generates/applies type 1 MAC subheader for the MAC subPDU if a 1st condition is met. For the type 1 MAC subheader, UE sets the first bit of MAC subheader to zero. UE sets the second bit of MAC subheader to zero regardless of the size of the corresponding/associated MAC SDU. UE sets the remaining 6 bits of the MAC subheader to a specific LCID indicating CCCH. UE generates/applies type 2 MAC subheader if a 1st condition is not met but a 2nd condition is met. For the type 2 MAC subheader, UE sets the first bit of the first byte of the MAC subheader to zero. UE sets the second bit of the first byte of the MAC subheader to zero if the corresponding/associated MAC SDU is smaller than 255 byte. UE sets the second bit of the first byte of the MAC subheader to one if the corresponding MAC SDU is larger than 255 bytes. UE sets the next 6 bits of the MAC subheader to a specific LCID indicating DCCH. UE include one byte or two byte of L field in the MAC subheader. 1st condition is met if the UL RRC message is CCCH SDU. 2nd condition is met if the UL RRC message is DCCH SDU. Alternatively, 1st condition is met if the UL RRC message is transmitted in the Msg 3. 2nd condition is met if the UL RRC message is transmitted in the MAC PDU that is not Msg 3. Alternatively, 1st condition is met if the UL RRC message is transmitted by the UL grant indicated in RAR and 2nd condition is met if the UL RRC message is transmitted by the UL grant indicated in DCI/PDCCH or by configured uplink grant.

UE generates MAC PDU 605 by putting the MAC subPDUs together and inserting padding bit in the end of the MAC PDU if the size of MAC subPDU is not enough to fill the MAC PDU. If there are more than one MAC subPDUs, UE places MAC subPDU containing/corresponding to UL RRC message in the front part of the MAC PDU.

UE transmits the MAC PDU using the UL resource 606.

Figure 6B:
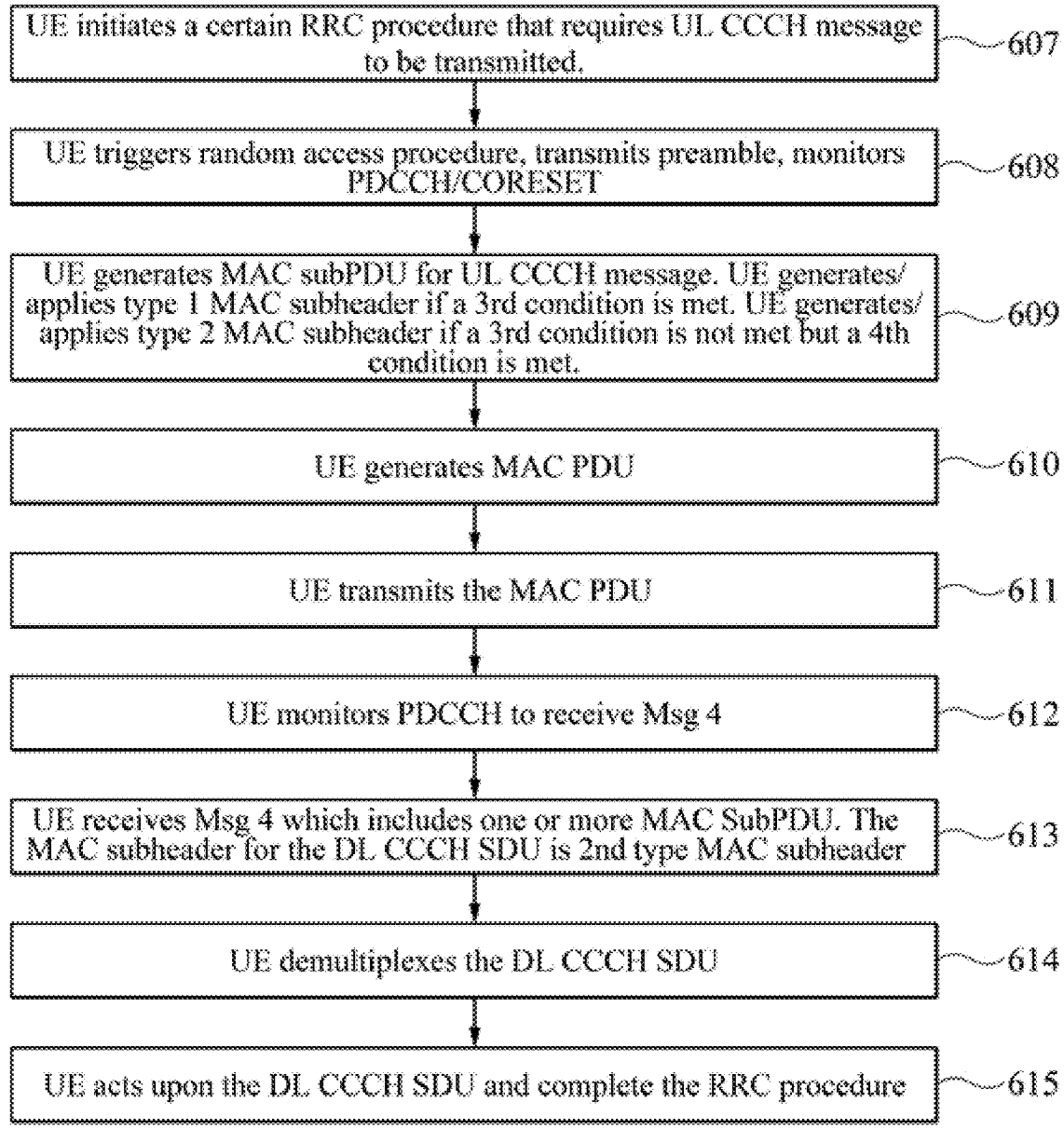
FIG. 6B is a flowchart illustrating another UE operation of transmitting and receiving RRC message.

FIG. 6B is a flowchart illustrating another UE operation of transmitting and receiving RRC message.

UE initiates a certain RRC procedure that requires UL CCCH message to be transmitted 607. RRC connection establishment procedure, RRC connection reestablishment procedure and RRC connection resume procedure are such procedures.

UE triggers random access procedure, transmits preamble, monitors PDCCH/CORESET to receive RAR and receives valid RAR 608. The RAR includes UL grant for new transmission which UE can use to transmit UL CCCH message.

UE generates MAC subPDU for UL CCCH message 609. The MAC subPDU contains a complete UL RRC message in the MAC SDU. UE generates/applies type 1 MAC subheader if a 3rd condition is met. For type 1 MAC subheader, UE sets the first bit of MAC subheader to zero. UE sets the second bit of MAC subheader to zero regardless of the size of the corresponding/associated MAC SDU. UE sets the remaining 6 bits of the MAC subheader to a specific LCID indicating 1st type CCCH. UE generates/applies type 2 MAC subheader if a 3rd condition is not met but a 4th condition is met. For type 2 MAC subheader, UE sets the first bit of the first byte of the MAC subheader to zero. UE sets the second bit of the first byte of the MAC subheader to zero regardless of the size of the associated MAC SDU. UE sets the next 6 bits of the MAC subheader to a specific LCID indicating 2nd type CCCH. UE includes one byte L field in the MAC subheader. 3rd condition is met if the UL CCCH SDU is 1st type CCCH SDU. 4th condition is met if the UL CCCH SDU is the 2nd type CCCH SDU. Alternatively, if the size of 1$^{st}$ type CCCH SDU is predetermined value (e.g. 56 bit) and the size of 2$^{nd}$ type CCCH SDU is another predetermined value (e.g. 72 bit), UE generates/applies type 1 MAC subheader for UL CCCH message regardless of whether it is 1$^{st}$ type CCCH SDU or 2$^{nd}$ type CCCH SDU. GNB determines the size of CCCH SDU based on LCID of the MAC subPDU carrying CCCH SDU. Alternatively, 3rd condition is met if the UL grant indicated in RAR is equal to a predefined value (e.g. 56 bit) and 4th condition is met if the UL grant indicated in RAR is greater than the predefined value. Alternatively, 3rd condition is met if the size of CCCH SDU is equal to a first predefined value and 4th condition is met if the size of CCCH SDU is greater than the first predetermined value (or equal to a second predetermined value). UE sets LCID to the first value (e.g. 000000) if the size of UL CCCH SDU is first predetermined value and sets LCID to the second value (e.g. 100001) if the size of UL CCCH SDU is second predetermined value.

UE generates MAC PDU 610 by putting the MAC subPDUs together and inserting padding bit in the end of the MAC PDU if the size of MAC subPDU is not enough to fill the MAC PDU. If there are more than one MAC subPDUs, UE places MAC subPDU containing/corresponding to UL RRC message in the front part of the MAC PDU.

UE transmits the MAC PDU using the allocated UL resource 611.

UE monitors PDCCH to receive Msg 4 612.

UE receives Msg 4 which includes one or more MAC SubPDU 613. The first MAC SubPDU includes Contention Resolution MAC CE. The second MAC SubPDU includes DL CCCH SDU. The MAC subheader for the DL CCCH SDU is 2nd type MAC subheader which consists with the F field, LCID field and L field. UE ignores the first bit of the MAC subheader. UE checks the LCID of the MAC subheader. If LCID indicates DL CCCH, UE checks the second bit of the MAC subheader to determine the size of L field. UE determines the size of L field from the second bit of the MAC subheader and determines the size of MAC SDU (in this case DL CCCH SDU) from the L field.

UE demultiplexes the DL CCCH SDU from the MAC PDU and decode the DL CCCH SDU 614.

UE acts upon the DL CCCH SDU and complete the RRC procedure 615.

$2^{nd}$ Embodiments

In this disclosure, methods and apparatus are provided to select serving cell, BWP and related parameters when Random Access Procedure is initiated. In a prior art, Random Access Procedure is performed in SpCell. In NR with introducing analog beam forming, Random Access Procedure should be performed in various serving cells depending on the reason why the Random Access Procedure is initiated.

In this disclosure, upon Random Access Procedure initiated, UE determines the serving cell, BWP and related parameters to be applied for the initiated Random Access Procedure with the considerations on the cause of Random Access Procedure, allocated resource and provided information from the network.

Figure 7A:
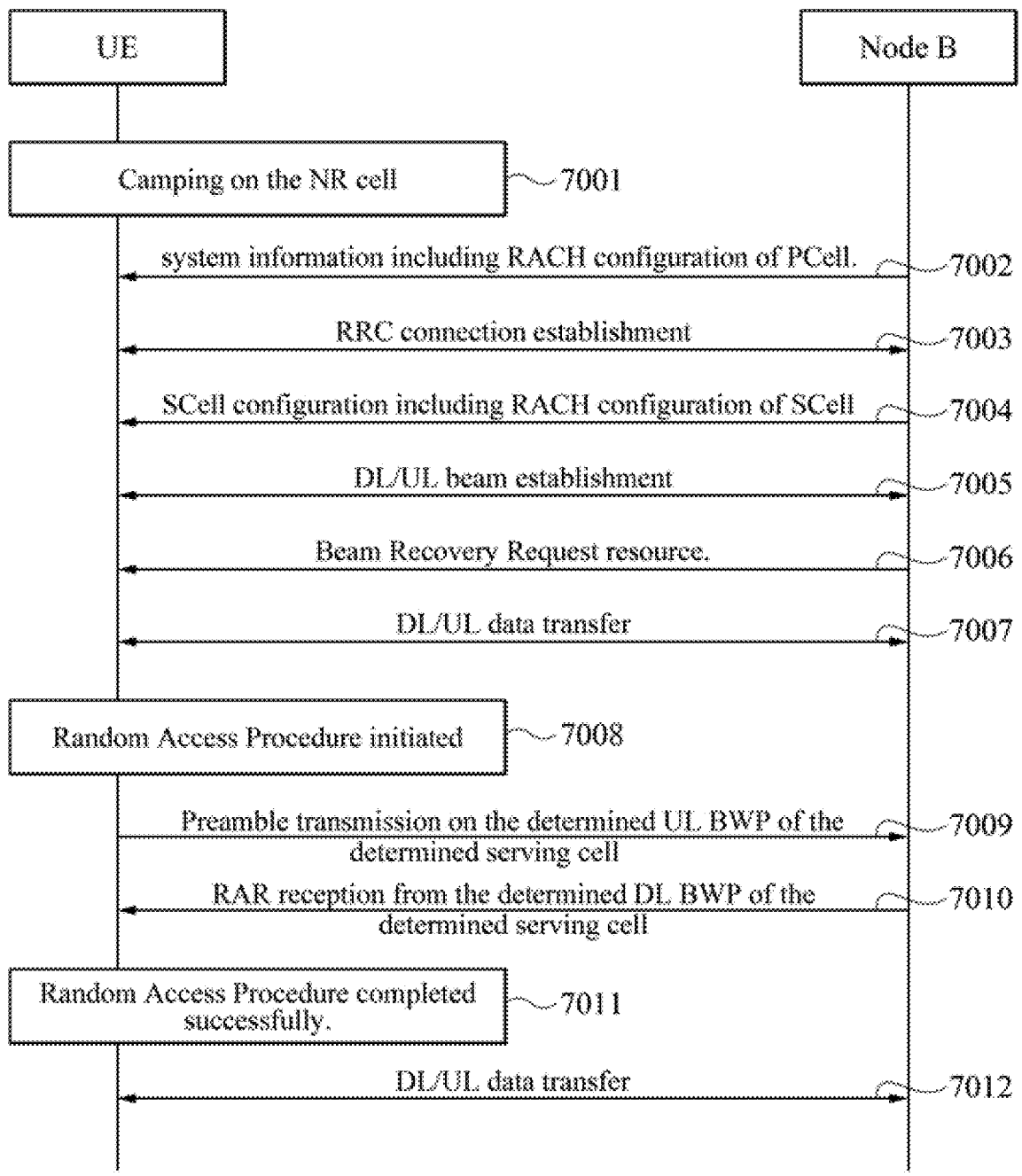
FIG. 7A is a flowchart illustrating triggering random access procedure at a UE and base station in a mobile communication system according to the 2nd embodiment of the present disclosure.

FIG. 7A is a flowchart illustrating triggering random access procedure at a UE and base station in a mobile communication system according to the $2^{nd}$ embodiment of the present disclosure.

UE camps on the NR cell if certain condition is fulfilled 7001. The condition includes whether the RSRP/RSRQ of PSS/SSS is above a certain threshold or better than that of the serving cell. When UE camp on the NR cell, the NR cell becomes UE's serving cell.

UE receives system information from the NR cell 7002. The system Information includes information required for random access procedure (i.e. RACH configuration information).

UE and GNB establish SRB 1 during the RRC connection establishment procedure 7003. RRC connection establishment procedure is embedded in the random access procedure. If the serving cell is operating in high frequency, UE and GNB establish the initial DL beam and initial UL beam during the random access procedure. Once RRC connection is successfully established, the serving cell becomes PCell.

After RRC connection procedure, RRCReconfiguration message can be sent to the UE to establish DRB for DL/UL data transfer.

GNB decides to add additional SCells to the UE to increase the data rate. GNB determines the configuration of the SCell.

UE receives SCell configuration including RACH configuration of SCell via SRB1 7004.

UE establishes DL/UL beam for the serving cell 7005. Via the beam establishment procedure, UE identify the DL Rx beam configuration and UL Tx beam configuration and GNB identify the DL Tx beam configuration and UL Rx beam configuration. Beam establishment of the SCell can be done by Random Access Procedure on the SCell.

GNB allocate Beam Recovery Request resource 7006. UE can perform contention free random access to recover beam when beam failure occurs. The resource consists with number of dedicate preambles and PRACH resources. The PRACH resource allocated for Beam Recovery Request can be different from (or not part of) the PRACH resource assigned in the RRC message for SCell addition in 7004. GNB can allocate Beam Recover Request resource for PCell as well. Beam Recovery Request resource can be allocated by MAC CE or by RRC message.

UE and GNB perform DL/UL data transfer using the established beams on the PCell and on the SCell 7007.

Due to some reasons, UE initiates Random Access Procedure 7008. UE determines on which UL BWP of which serving cell the preamble shall be transmitted and from which DL BWP of which serving cell the RAR shall be monitored.

UE transmits preamble on the determined UL BWP of the determined serving cell 7009.

UE monitors the determined DL BWP of the determined serving cell to receive RAR 7010.

When predetermined event occur, UE consider the Random Access Procedure completed successfully 7011.

UE and GNB perform DL/UL data transfer using the established beams on the PCell and on the SCell 7012.

Figure 7B:
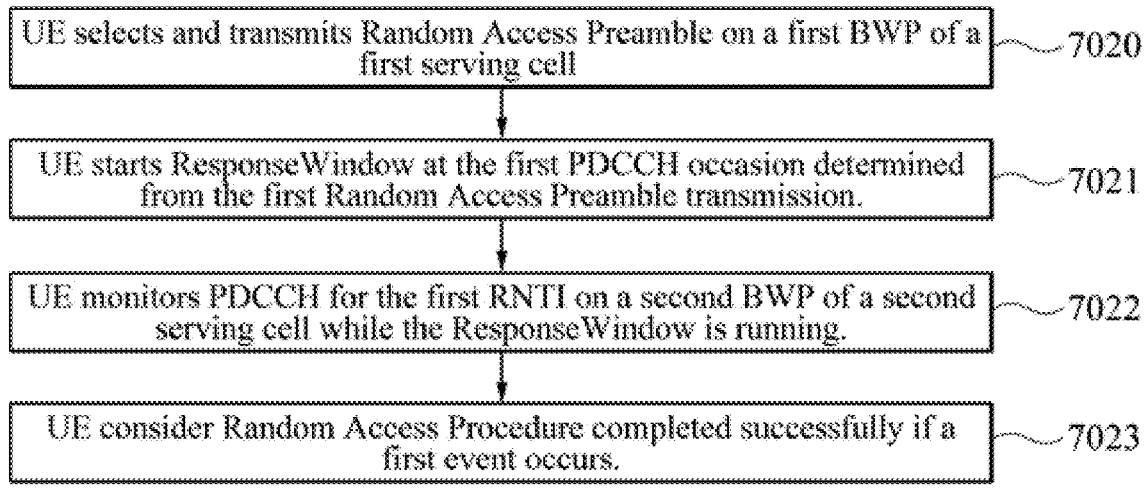
FIG. 7B is a flowchart illustrating UE operation when random access procedure is initiated.

FIG. 7B is a flowchart illustrating UE operation when random access procedure is initiated.

UE selects and transmits Random Access Preamble on a first BWP of a first serving cell 7020.

The first serving cell is a serving cell where beam failure is detected if Random Access Procedure is initiated by beam failure detection.

The first serving cell is a serving cell indicated by PDCCH order if Random Access Procedure is initiated by PDCCH order.

The first serving cell is SpCell if Random Access Procedure is initiated by other reasons (e.g. uplink data arrival or Scheduling Request failure).

The first BWP is the UL BWP where random access resources for beam failure recovery request is configured if Random Access Procedure is initiated by beam failure detection and if contention free random access resource is to be used.

The first BWP is the initial BWP (or first active BWP) of the serving cell where beam failure is detected if Random Access Procedure is initiated by beam failure detection and if contention based random access resource is to be used.

The first BWP is the UL BWP indicated by PDCCH order if Random Access Procedure is initiated by PDCCH order.

The first BWP is the active UL BWP of SpCell if Random Access Procedure is initiated by other reasons (e.g. uplink data arrival or Scheduling Request failure). If the active UL BWP of SpCell is not configured with RACH resource, the first BWP is the initial BWP of SpCell.

UE starts ResponseWindow at the first PDCCH occasion determined from the first Random Access Preamble transmission 7021.

UE monitors PDCCH for the first RNTI on a second BWP of a second serving cell while the ResponseWindow is running 7022.

The second serving cell is a serving cell where beam failure is detected if Random Access Procedure is initiated by beam failure detection.

The second serving cell is SpCell if Random Access Procedure is initiated by PDCCH order.

The second serving cell is SpCell if Random Access Procedure is initiated by other reasons (e.g. uplink data arrival).

The second BWP is the DL BWP linked/associated/paired with the UL BWP where random access preamble is transmitted if Random Access Procedure is initiated by beam failure detection and the serving cell is in unpaired spectrum.

The second BWP is the active DL BWP if Random Access Procedure is initiated by beam failure detection and the serving cell is in paired spectrum.

The second BWP is the active DL BWP of SpCell if Random Access Procedure is initiated by PDCCH order.

The second BWP is the active DL BWP of SpCell if Random Access Procedure is initiated by other reasons (e.g. uplink data arrival).

The first RNTI is C-RNTI if Random Access Procedure is/was initiated by beam failure detection and Random Access Preamble is transmitted in the contention free random access resource configured for beam failure recovery request.

The first RNTI is RA-RNTI that is associated with the PRACH resource in which the Random Access Preamble is transmitted if Random Access Preamble is not transmitted in the contention free random access resource configured for beam failure recovery request (i.e. random access resource is selected by UE among the random access resource indicated/broadcast in the system information. Random Access Preamble is transmitted in the contention based random access resource).

UE consider Random Access Procedure completed successfully if a first event occurs 7023.

The first event occurs when UE receives PDCCH transmission addressed by C-RNTI while ResponseWindow is running if the Random Access Procedure is/was initiated by beam failure detection and if contention free random access resource is/was used for Random Access Preamble transmission.

The first event occurs when UE receives, during when ContentionResolutionTimer is running, the PDCCH transmission addressed to C-RNTI in the serving cell where Random Access Preamble is transmitted if the Random Access Procedure is initiated by beam failure detection and if contention based random access resource is/was used for Random Access Preamble transmission.

The first event occurs when UE receives, during when ContentionResolutionTimer is running, the PDCCH transmission addressed to C-RNTI and containing UL grant for new a new transmission in the SpCell if the Random Access Procedure is initiated by uplink data arrival (i.e. C-RNTI MAC CE was included in Msg 3).

3$^{rd}$ Embodiments

In NR system comparing to LTE system, the size of CSI (Channel State Indication/Information) reporting is considerably increased. Relying on only periodic CSI reporting is not efficient, and GNB needs a mean to acquire CSI reporting when it is required. In this disclosure, UE is provided with periodic/persistent CSI reporting configuration and semi-persistent CSI reporting configuration. UE performs P-CSI (periodic/persistent CSI) reporting in the active UL BWP of a predetermined serving cell without additional indication from GNB. UE performs SP-CSI (Semi Persistent-CSI) reporting in the active UL BWP of a predetermined serving cell when GNB activate SP-CSI reporting configuration. Upon UL BWP switching, UE deactivate SP-CSI reporting configuration which is active before UL BWP switching. When UE switches back to the UL BWP, explicit indication from GNB is required to activate the SP-CSI reporting configuration in the UL BWP. Upon UL BWP switching, UE suspends P-CSI reporting configuration and resume P-CSI reporting configuration when UE switches back to the UL BWP.

Figure 8A:
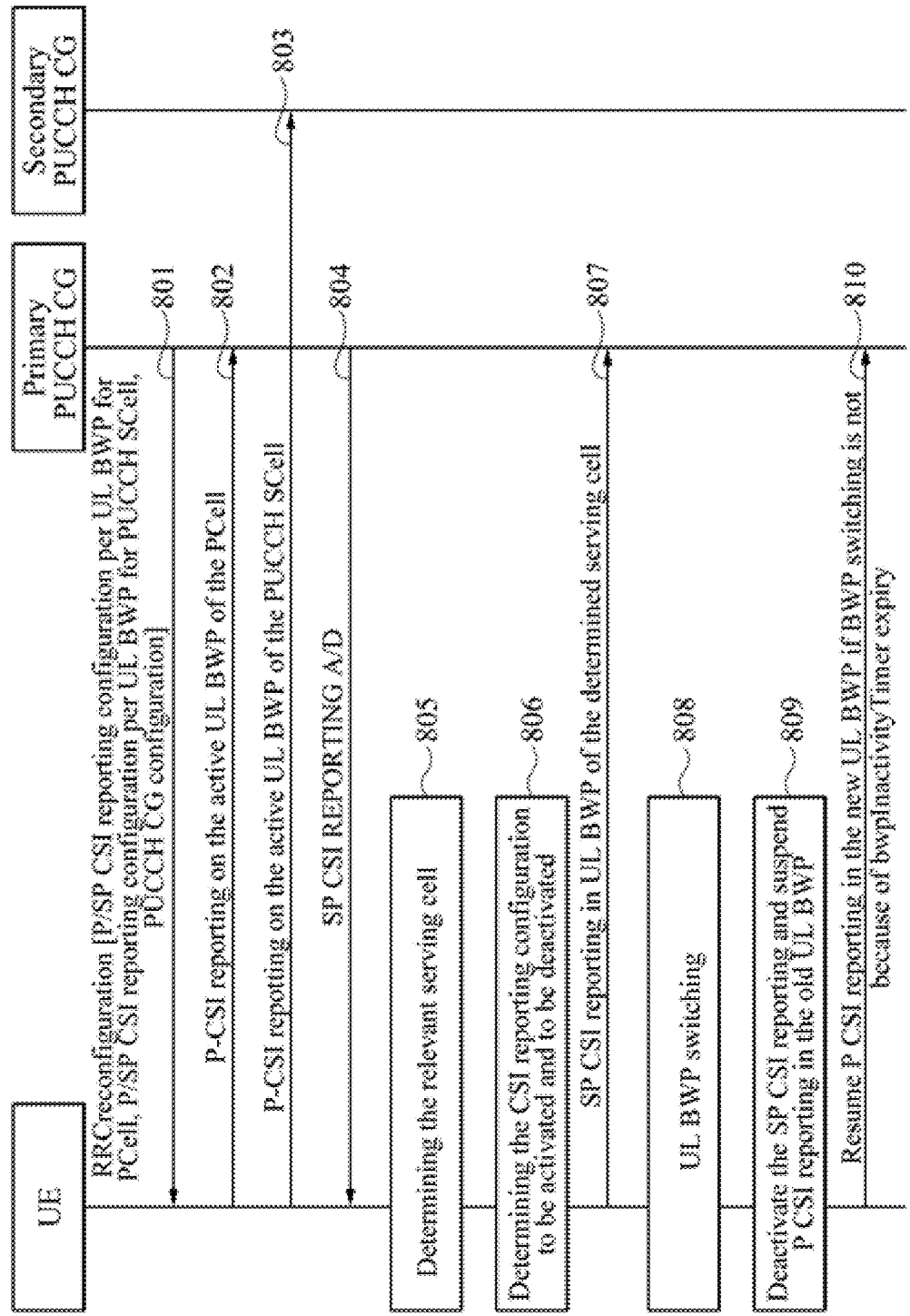
FIG. 8A is a flowchart illustrating the overall operation of the 3rd embodiment.

FIG. 8A is a flowchart illustrating the overall operation of the 3rd embodiment.

UE receives from GNB RRCReconfiguration message including CSI reporting configurations 801.

UE performs P-CSI reporting on the active UL BWP of the PCell 802.

UE performs P-CSI reporting on the active UL BWP of the PUCCH SCell 803.

UE receives from GNB SP-CSI REPORTING A/D MAC CE 804.

UE determines the relevant serving cell and relevant uplink (i.e. which uplink of which serving cell is relevant with the SP-CSI REPORTING A/D MAC CE) 805.

UE determines the SP-CSI reporting configurations to be activated and SP-CSI reporting configurations to be deactivated 806.

For activated SP-CSI reporting configuration, UE performs SP-CSI reporting in the UL BWP of the determined serving cell 807. UE transmits CSI reporting on the predetermined CSI report resource with a predetermined CSI format in which the CSI information of predetermined CSI Reference Signal is reported. The CSI report resource, CSI format and the CSI Reference Signal are linked/associated with the activated/corresponding SP-CSI reporting configuration.

UL BWP switching occurs 808. This can happen due to reception of DCI for DL scheduling, DCI for UL scheduling or bwpInactivityTimer expiry.

UE deactivates the SP-CSI reporting and suspend P-CSI reporting in the old UL BWP (the UL BWP that is active before UL BWP switching) 809.

UE resume P-CSI reporting in the new UL BWP if BWP switching is not because of bwpInactivityTimer expiry (if BWP switching is because of bwpInactivityTimer expiry, GNB may not know that UE switches BWP. If P-CSI reporting is resumed, only uplink interference increases without any benefit) 810.

Figure 8B:
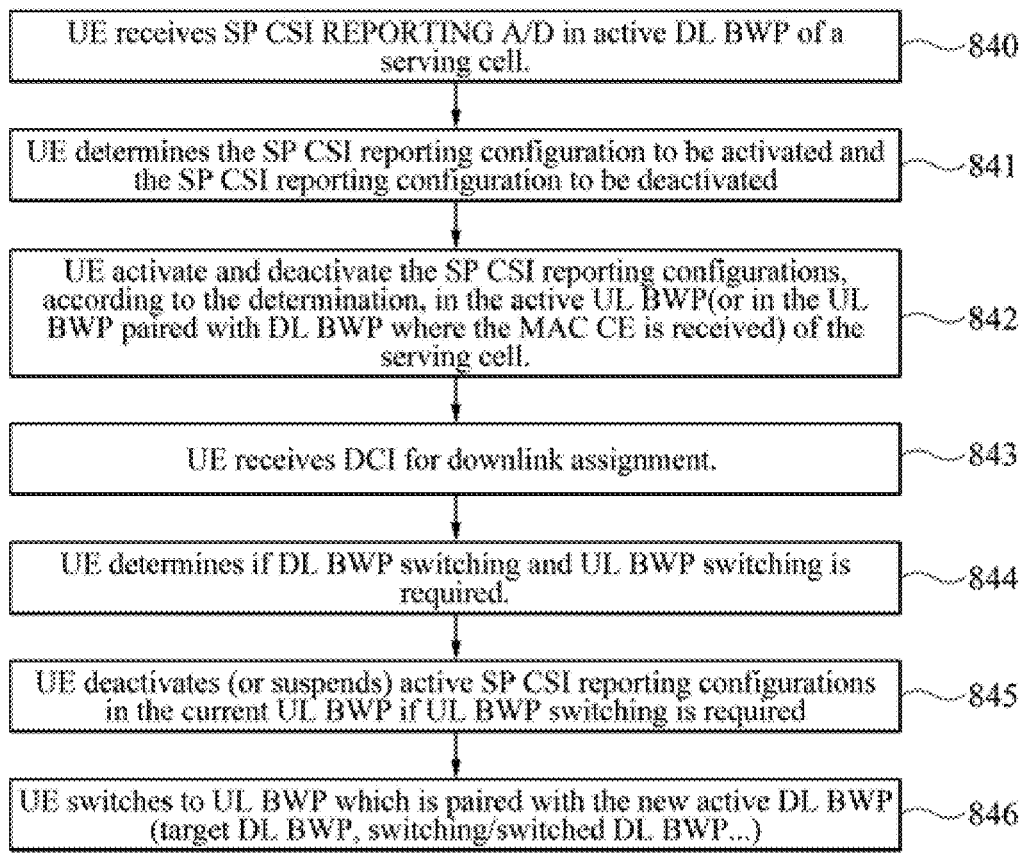
FIG. 8B is a flowchart illustrating the UE operation upon receiving SP-CSI REPORTING A/D MAC CE.

FIG. 8B is a flowchart illustrating the UE operation upon receiving SP-CSI REPORTING A/D MAC CE.

UE receives SP-CSI REPORTING A/D in active DL BWP of a serving cell of a PUCCH CG(Cell Group) 840.

UE determines the SP-CSI REPORTING A/D reporting configuration to be activated and the SP-CSI reporting configuration to be deactivated 841.

UE first determines for which PUCCH CG the SP-CSI REPORTING A/D is relevant considering the serving cell where SP-CSI REPORTING A/D is received. UE then determines for which serving cell the SP-CSI REPORTING A/D is relevant (if it is primary PUCCH CG, relevant serving cell is SpCell. if it is secondary PUCCH CG, relevant serving cell is PUCCH SCell). UE then determines which SP-CSI reporting configuration of the determined serving cell is activated or deactivated based on Si field of the received SP-CSI REPORTING A/D.

For SP-CSI reporting configurations of SpCell if SP CSI REPORTING MAC CE is received from a serving cell of Primary PUCCH CG, or for SP-CSI reporting configurations of PUCCH SCell if SP CSI REPORTING MAC CE is received from a serving cell of secondary PUCCH CG, SP-CSI reporting configuration which is not activated when the MAC CE is received and whose Si is set to one in the MAC CE is the SP-CSI reporting configuration to be activated.

SP-CSI reporting configuration which is activated when the MAC CE is received and whose Si is set to zero in the MAC CE is the SP-CSI reporting configuration to be deactivated UE activate and deactivate the SP-CSI reporting configurations of SpCell or of PUCCH SCell, according to the determination, in the active UL BWP (or in the UL BWP paired with DL BWP where the MAC CE is received) of the serving cell. If SUL is configured in the SpCell or PUCCH SCell, two UL BWPs can be activated (one in UL and the other in SUL) 842. The UL BWP where SP-CSI reporting is activated or deactivated is the UL BWP of the uplink configured with P-CSI reporting configuration (or UL configured with PUCCH).

UE receives DCI for downlink assignment for SpCell or for PUCCH SCell 843.

UE determines if DL BWP switching and UL BWP switching is required for SpCell or PUCCH SCell 844. If DCI includes the DL assignment of the DL resource which is not part of the current DL BWP, then DL BWP switching is required. If the serving cell is in the unpaired spectrum, UE switches DL BWP and UL BWP simultaneously, hence UL BWP switching is also required.

UE deactivates (or suspends) active SP-CSI reporting configurations and suspend P-CSI reporting configuration in the current UL BWP if UL BWP switching is required 845.

UE switches to UL BWP which is paired with the new active DL BWP (a.k.a target DL BWP, switching/switched DL BWP . . . ) 846 and resume P-CSI reporting if P-CSI reporting configuration is configured for the new active UL BWP.

Figure 8C:
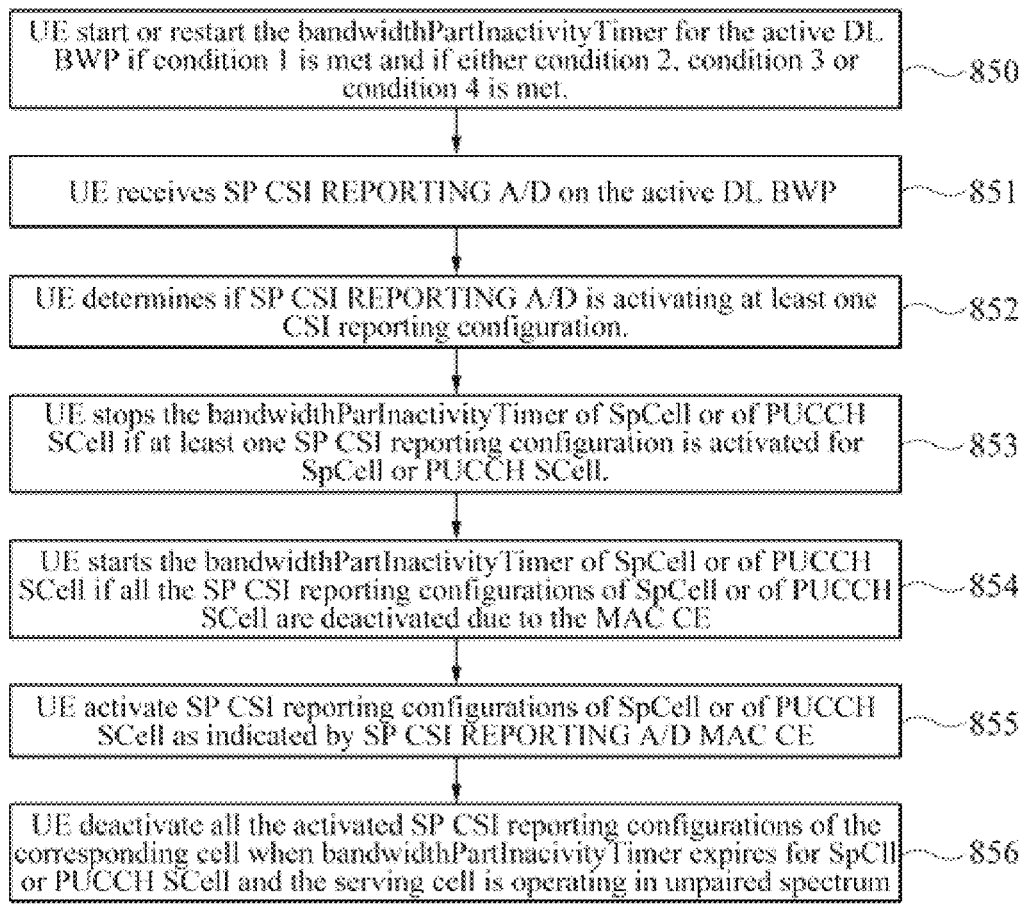
FIG. 8C is a flowchart illustrating another UE operation in handling bandwidthPartInactivityTimer.

FIG. 8C is a flowchart illustrating another UE operation in handling bandwidthPartInacivityTimer.

UE start or restart the bandwidthPartInacivityTimer for the active DL BWP if condition 1 is met and if either condition 2, condition 3 or condition 4 is met 850.

condition 1 is met if the active DL BWP is not the BWP indicated by the default-DL-BWP (or default DL BWP)

condition 2 is met if a PDCCH indicating downlink assignment or uplink grant is received on the active BWP condition 3 is met if a MAC PDU is transmitted in a configured uplink grant or received in a configured downlink assignment condition 4 is met if a PDCCH for BWP switching is received on the active DL BWP and the MAC entity switches the active BWP UE receives SP-CSI REPORTING A/D on the active DL BWP 851.

UE determines if SP-CSI REPORTING A/D is activating at least one CSI reporting configuration 852.

If the SpCell or PUCCH SCell is operating in unpaired spectrum, UE stops the bandwidthPartInacivityTimer of SpCell or of PUCCH SCell if at least one SP-CSI reporting configuration is activated for SpCell or PUCCH SCell. By doing this, switching to the default UL BWP while SP-CSI reporting is active is avoided 853.

If the SpCell or PUCCH SCell is operating in unpaired spectrum, UE starts the bandwidthPartInacivityTimer of SpCell or of PUCCH SCell if all the SP-CSI reporting configurations of SpCell or of PUCCH SCell are deactivated due to the MAC CE 854. By doing this, switching to default BWP when no data activity is there for a while can be achieved.

UE activate SP-CSI reporting configurations of SpCell or of PUCCH SCell as indicated by SP-CSI REPORTING A/D MAC CE 855.

UE deactivate all the activated SP-CSI reporting configurations and suspend P-CSI of the corresponding cell when bandwidthPartInacivityTimer expires for SpCll or PUCCH SCell and the serving cell is operating in unpaired spectrum 856.

Figure 8D:
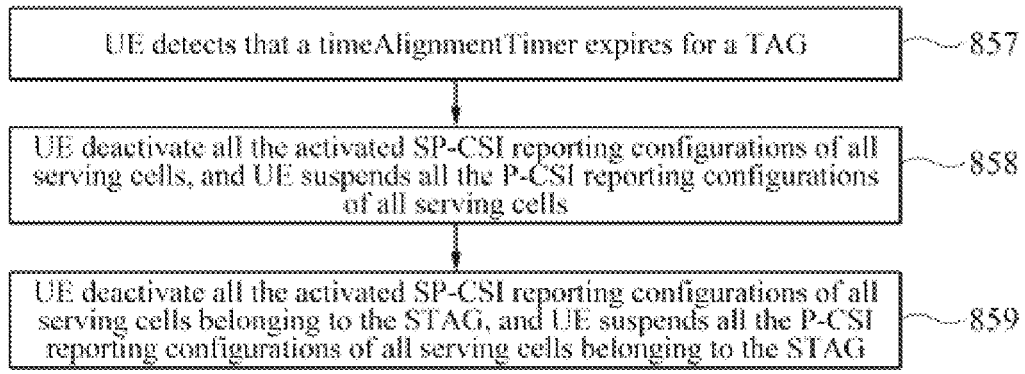
FIG. 8D is a flowchart illustrating UE operation upon timeAlgnmentTimer expiry.

FIG. 8D is a flowchart illustrating UE operation upon timeAlgnmentTimer expiry.

UE detects that a timeAlignmentTimer expires for a TAG 857.

UE deactivate all the activated SP-CSI reporting configurations of all serving cells (including serving cells belonging to other TAGs) if the timeAlignmentTimer is associated with the PTAG. UE suspends all the P-CSI reporting configurations of all serving cells if the timeAlignmentTimer is associated with the PTAG 858.

UE deactivate all the activated SP-CSI reporting configurations of all serving cells belonging to the STAG if the timeAlignmentTimer is associated with an STAG. UE suspends all the P-CSI reporting configurations of all serving cells belonging to the STAG if the timeAlignmentTimer is associated with the STAG 859.

Hereinafter RRC messages, terminologies and general procedures that might help readers to understand the disclosure are further explained.

System Information consists of MIB, SIB1, SIB2 and other SIBs.

MIB includes following information: SFN, SCS (sub carrier spacing) for random access and RMSI etc.

SIB1 includes following information: scheduling information for SIBG/SI, value tags for SIBs, Frequency Band Indicator etc. A value tag is indicated for each SIB (except MIB, SIB1 and SIB2). UE determines whether it need to request SIB or not based on the value tag. If the value tag of SIB x indicated in SIB1 of the serving cell is different from the value tag of SIB x UE currently stores, UE considers SIB x for SI request.

Instead of transmitting individual SIB at a time, a group of SIBs (SIB group or SIBG) is transmitted. SIBG (which can be simply called SI) is used to convey one or more system information blocks. All the SIBs included in a SIBG are transmitted with the same periodicity. SIBG/SI scheduling information includes the periodicity information. The information regarding which SIBG/SI convey which SIBs are also included in SIBG/SI scheduling information.

SIB2 contains radio resource configuration information that is common for all UEs. It includes following information: RACH configuration information, paging configuration information, PDSCH configuration information, PUSCH configuration information etc.

MIB and SIB1 are classified as MSI (Minimum System Information) and transmitted periodically in the predefined frequency location at the predefined time occasion.

SIB 2 is classified as RMSI (Remaining Minimum System Information) and transmitted periodically in the frequency location at the time occasion indicated in MSI.

Other SIBs are classified as OSI (Other System Information) and transmitted when UE request.

BWP is the abbreviation of Bandwidth part. It is introduced to make it possible that a single cell can serve different types of UEs having different bandwidth capabilities.

Figure 9:
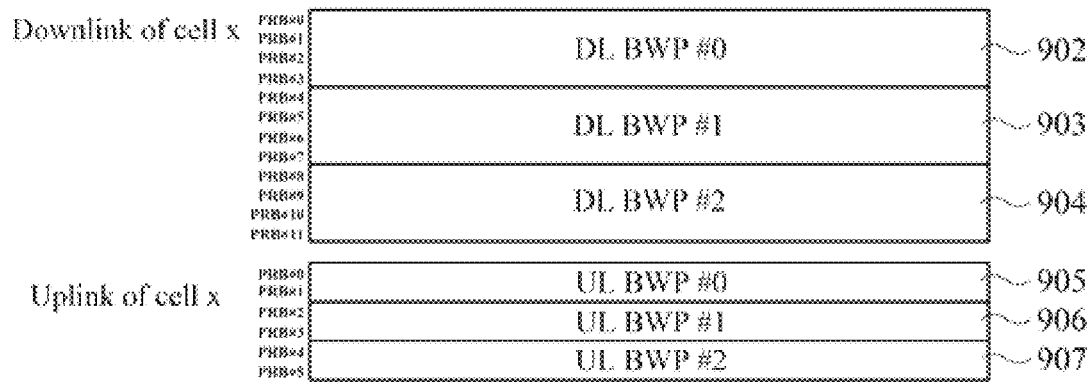
FIG. 9 is a diagram illustrating BWP in a mobile communication system.

In NR, a cell can consist of one or more than one BWPs. BWP is the group of contiguous PRBs. For example, as described in FIG. 9, cell x consists of 3 DL BWPs and 3 UL BWPs. DL BWP #0 (902) consists of PRB #0~PRB #3. DL BWP #1 (903) consists of PRB #4~PRB #7. DL BWP #2 (904) consists of PRB #8~PRB #11. UL BWP #0 (905) consists of PRB #0~PRB #1. UL BWP #1 (906) consists of PRB #2~PRB #3. UL BWP #2 (907) consists of PRB #4~PRB #5.

UE can be configured with multiple BWPs of a serving cell via RRC signaling. In UE perspective, configured BWP can be either in activated state or in deactivated state. Only one BWP can be in activated state for a UE.

Activation/deactivation of BWP can be controlled by DCI. For example, if UE with the DL BWP #0 being currently activated receives DCI scheduling DL PRB of other BWP (e.g. PRB #4), then activated DL BWP of the UE changes from DL BWP #0 to the other DL BWP (DL BWP #1 in this case). Likewise, if UE with the UL BWP #0 being currently activated receive DCI scheduling UL PRB of other BWP (e.g. PRB #4), then activated UL BWP of the UE changes from UL BWP #0 to the other UL BWP (UL BWP #2 in this case).

In FDD, DL BWP and UL BWP are switched independently e.g. when DL BWP #0 and UL BWP #0 are the activated BWPs for the UE at a certain point of time, activated DL BWP can be switched to e.g. DL BWP #2 while activated UL BWP is kept same.

In TDD and for limited capability UEs, switching DL BWP and UL BWP together is more beneficial. In TDD, DL and UL are used in the same frequency region, hence if DL BWP and UL BWP does not change together, UE may be required to change its RF upon every DL-UL change or UL-DL change.

The decision whether to associate a certain DL BWP and a certain UL BWP and to manage them together (e.g. switch them together) or to handle DL BWP and UL BWP independently should be made by GNB taking UE RF capability into account. It is also related with which FBG the serving cell's FB belongs to (e.g. whether the serving cell is the FDD cell or TDD cell).

FBG is the abbreviation of Frequency Band Group. FBG1 is the group of FDD bands. FBG2 is the group of TDD bands.

BWP information include initial BWP id, default BWP id, multiple of DL BWP information(s) and multiple of UL BWP information(s). If only initial BWP id is included, default BWP is same as initial BWP. If only default BWP id is included, initial BWP is same as default BWP. If neither default BWP id nor initial BWP id is included, BWP with BWP id 0 (or BWP with the lowest BWP id) is the default BWP and initial BWP. When a RRC message configured multiple BWPs, UE starts with the initial BWP and switch to other BWPs by GNB control. Upon certain event (like expiry of BWPinactivityTimer), UE switches to the default BWP.

DL BWP information consists of following information: BWPid, SCS, frequency domain location of the BWP (e.g. ARFCN indicating the center frequency of the BWP or PRB index/id of the center PRB), bandwidth of the BWP (e.g. the number of PRB), CSI-RS configurations UL BWP information consists of following information: BWPid, SCS, frequency domain location, bandwidth initial BWP information is provided in the system information. UE use the initial BWP until dedicate BWP is configured. dedicate BWP information is provided in the RRC control message. When dedicate BWP(s) are configured, UE start using initial BWP. When GNB instruct UE to switch the BWP, UE stops using (or deactivate) the initial BWP and start using (or activate) the indicated BWP. When BWP timer expires, UE switch to the default BWP (i.e. stop using the current BWP and start using the default BWP).

In the UL BWP of a certain serving cell (i.e. SpCell or PUCCH SCell), P-CSI and SP-CSI can be configured. In each of UL BWP information of those serving cells, one P-CSI reporting configuration and multiple SP-CSI reporting configurations can be signaled.

MAC PDU Format

Figure 10:
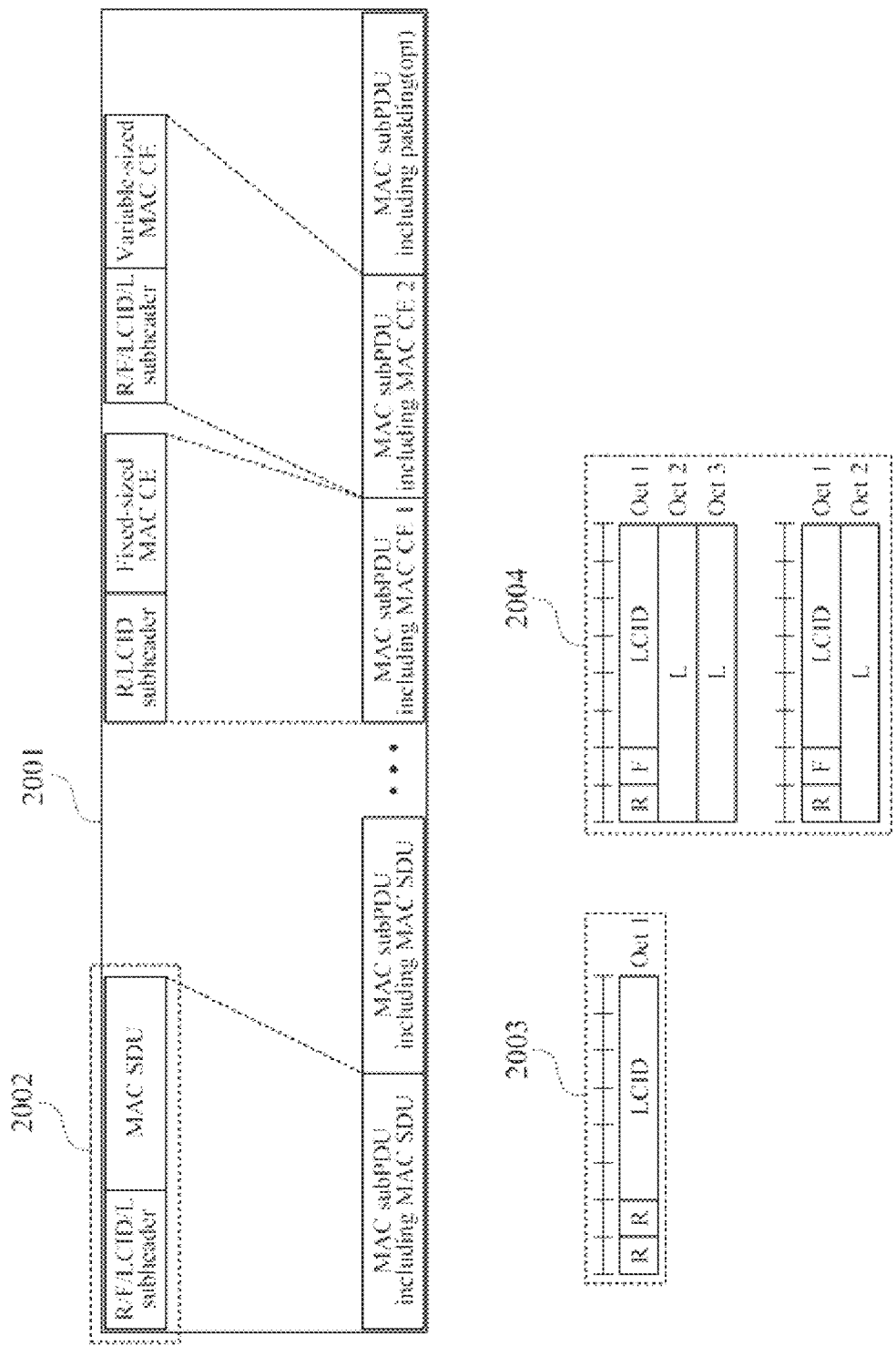
FIG. 10 is a diagram illustrating a format of MAC PDU.

A MAC PDU consists of one or more MAC subPDUs (2001) as described in FIG. 10. Each MAC subPDU consists of one of the following:

A MAC subheader only (including padding);
A MAC subheader and a MAC SDU (2002);
A MAC subheader and a MAC CE;
A MAC subheader and padding.

MAC SDU above can be CCCH message, DCCH message or DTCH message.

MAC subheader consists of R bit, F bit, LCID field and L field. In the disclosure, type 1 MAC subheader (2003) is the MAC subheader consisting only with two R bits and LCID field. Type 2 MAC subheader(2004) is the MAC subheader consisting with R bit, F bit, LCID field and L field.

LCID: The Logical Channel ID field identifies the logical channel instance of the corresponding MAC SDU or the type of the corresponding MAC CE or padding. There is one LCID field per MAC subheader. The LCID field size is 6 bits. For RRC message transmitted in SRB 0, either LCID 000000 or LCID 100001 is indicated depending on the type of message transmitted in the SRB0. For SRB 1, LCID 000001 is indicated. For SRB2, LCID 000010 is indicated.

L: The Length field indicates the length of the corresponding MAC SDU or variable-sized MAC CE in bytes. There is one L field per MAC subheader except for subheaders corresponding to fixed-sized MAC CEs, padding and some CCCH SDUs. The size of the L field is indicated by the F field;

F: The Format field indicates the size of the Length field. There is one F field per MAC subheader except for subheaders corresponding to fixed-sized MAC CEs, padding and some CCCH SDUs. The size of the F field is 1 bit. The value 0 indicates 8 bits of the Length field. The value 1 indicates 16 bits of the Length field;

R: Reserved bit, set to zero.

DCI

DCI is the abbreviation of Downlink Control Information. It is interchangeable with PDCCH (Physical Downlink Control Channel). DCI is used for downlink assignment scheduling, uplink grant scheduling or other purposes.

IE

IE is Information Element and refer to the information included in the RRC message.

RRCRequest

RRC connection request (RRCRequest) message include following information elements: UE identity allocated by MME/AMF and establishment cause RRCSetup RRC connection setup (RRCSetup) message include following information elements: SRB1 configuration information, BWP configuration information(s) and other information necessary for UE and GNB to transmit and receive RRC messages.

RRC Reconfiguration

RRC connection reconfiguration (RRCReconfiguration) message include following information elements: SRB2 configuration information, DRB configuration information, BWP configuration information(s), DRX configuration, SPS configuration, SCell configuration and other information necessary for UE and GNB to transmit and receive DRB efficiently.

NR Configuration Information

NR configuration information consist of following information. NR serving cell configuration such as the center frequency of the serving cell, serving cell index; Bearer configuration such as NR PDCP configuration and NR RLC configuration; NR DRX configuration.

NR DRX Configuration Information

NR DRX configuration information consists of following information. NR onDurationTimer, NR inactivityTimer, NR Long-DRX cycle, NR Short-DRX cycle, NR DRX start offset, NR retransmissionTimer, NR UL retransmissionTimer, NR HARQ RTT timer and NR UL HARQ RTT timer.

PHR Configuration

PHR configuration consist of following information: A timer value for periodic reporting, a timer value to prohibit too frequent reporting and pathloss change threshold etc.

SCell Configuration

SCell configuration consist of following information: center frequency of the SCell, SCellIndex and serving cell information etc.

Serving Cell Information

Serving cell information consists of following information: BWP information, PDSCH configuration, PUSCH configuration, P-CSI reporting configuration per UL BWP of a specific uplink (if SpCell or PUCCH SCell), SP-CSI reporting configurations per UL BWP of a specific uplink (if SpCell or PUCCH SCell). When supplemental uplink is configured for SpCel or PUCCH SCell, Serving cell information indicate which uplink between SUL and UL the P-CSI reporting and SP-CSI reportings are configured.

Supplemental Uplink Configuration

Supplemental uplink configuration consist of following information: center frequency of the supplemental uplink, associated serving cell (if absent, the SUL is associated with PCell downlink), uplinkIndex etc. associated serving cell is indicated by SCellIndex, and the SUL is associated with the DL of the indicated serving cell. Being associated with DL of a serving cell means that pathloss of the serving cell is used in calculating the uplink transmission power, and PDCCH/DCI for the SUL can be transmitted from the associated serving cell.

Time Alignment Group

TAG is the Timing Advance Group. Timing Advance Group is a group of Serving Cells that is configured by RRC and that, for the cells with an UL configured, using the same timing reference cell and the same Timing Advance value. A Timing Advance Group containing the SpCell of a MAC entity is referred to as PTAG, whereas the term STAG refers to other TAGs.

SPS/Configured Uplink Grant

SPS configuration information consists of three parts; common configuration information, DL SPS configuration information and UL SPS configuration information. Common configuration information that is applicable for both DL SPS and UL SPS. Common configuration information includes the information like SPS C-RNTI and the information to which serving cell the SPS configuration is applicable. DL SPS configuration includes the number of DL HARQ process that can be used for DL SPS and DL SPS periodicity. UL SPS configuration includes the number of UL HARQ processes that can be used for UL SPS and UL SPS periodicity.

C-RNTI is UE identity uniquely identifying UE in a given cell and used for dynamic scheduling.

SPS C-RNTI is used to activate or release SPS and different from C-RNTI (can be considered as additional C-RNTI for SPS scheduling). It can be called by different names (i.e. other than SPS C-RNTI)

DL SPS resource can be called configured downlink assignments.

UL SPS resource can be called configured uplink grant.

UL SPS can be called uplink transmission without grant or grant free transmission.

DL SPS activation (that SPS is activated) can be same as configured downlink assignment initialization (configured downlink assignment is initialized)

UL SPS activation (that SPS is activated) can be same as configured uplink grant initialization (configured uplink grant is initialized)

DL SPS deactivation (that SPS is deactivated) can be same as configured downlink assignment release (configured downlink assignment is released)

UL SPS deactivation (that SPS is deactivated) can be same as configured uplink grant release (configured uplink grant is released)

DL SPS or UL SPS is activated or deactivated by receiving PDCCH/DCI for UE's SPS C-RNTI.

UL SPS activation command is the PDCCH/DCI for SPS C-RNTI indicating to activate configured uplink grant.

The SPS confirmation MAC control element is identified by a MAC PDU subheader with a specific LCID and has fixed size of zero bits (i.e. it is MAC subhead only MAC CE). By receiving SPS confirmation MAC Control Element, GNB knows that the SPS activation/deactivation is successful.

RRC Message in General

In the disclosure, 'indicating A in a RRC message' can be same as 'instructing A`' or 'commanding A`', while A` is the action corresponding to A.

In the disclosure, 'receiving A in a RRC message' can be same as 'doing A` as a result of receiving the RRC message and decoding A'.

DRX

LTE DRX configuration information consists of following information. onDurationTimer, inactivityTimer, Long-DRX cycle, Short-DRX cycle, DRX start offset, retransmissionTimer and UL retransmissionTimer.

LTE DRX operation is as following. UE and ENB determines the starting subframe of on-Duration based on the DRX cycle and DRX start offset. UE and ENB starts onDuration and monitor PDCCH. If new transmission is scheduled, UE and ENB start inactivityTimer which is restarted when new transmission is scheduled. retransmissionTimer and UL retransmissionTimer are for retransmission to be scheduled. They start when HARQ RTT timer or UL HARQ RTT timer expires and stops when corresponding retransmission is scheduled. HARQ RTT timer and UL HARQ RTT timer start when DL assignment or UL grant is received.

SCell Activation/Deactivation MAC CE

The SCell Activation/Deactivation MAC CE (A/D MAC CE) of one octet is identified by a MAC PDU subheader with LCID. It has a fixed size and consists of a single octet containing seven C-fields and one R-field.

$C_i$: if there is an SCell configured with SCellIndex i as specified in TS 38.331 [8], this field indicates the activation/deactivation status of the SCell with SCellIndex i, else the MAC entity shall ignore the $C_i$ field. The $C_i$ field is set to "1" to indicate that the SCell with SCellIndex i shall be activated. The Ci field is set to "0" to indicate that the SCell with SCellIndex i shall be deactivated;

R: Reserved bit, set to "0".

Timing Advance Command MAC CE

The Timing Advance Command MAC CE is identified by MAC PDU subheader with LCID. It has a fixed size and consists of a single octet defined as follows.

TAG Identity (TAG ID): This field indicates the TAG Identity of the addressed TAG. The TAG containing the SpCell has the TAG Identity 0. The length of the field is 2 bits;

Timing Advance Command: This field indicates the index value TA (0, 1, 2 . . . 63) used to control the amount of timing adjustment that MAC entity has to apply (as specified in TS 38.213 [6]). The length of the field is 6 bits.

Multiple OFDM Numerologies

Multiple OFDM numerologies as given by Table below are supported in NR.

| mu | Sub-Carrier Spacing (delta f) |
|---|---|
| 0 | 15 |
| 1 | 30 |
| 2 | 60 |
| 3 | 120 |
| 4 | 240 |

PUCCH SCell

A SCell configured with PUCCH. PUCCH SCell supports PUCCH transmission for serving cells belonging to the PUCCH Cell Group.

PUCCH Cell Group

A group of serving cells whose CSI and HARQ feedbacks are reported in a serving cell (either SpCell or PUCCH SCell). When PUCCH SCell is configured, the list of serving cells grouped together with the PUCCH SCell are signaled in the same RRC message. A PUCCH Cell Group containing the SpCell of a MAC entity is referred to as Primary PUCCH Cell group, whereas the term Secondary PUCCH Cell group refers to other TAGs (i.e. containing PUCCH SCell). The PUCCH Cell Group SCells not belonging to any Secondary PUCCH Cell Groups belong to Primary PUCCH Cell Group (where SpCell provides CSI and HARQ feedback)

Serving Cell

A Primary or a Secondary Cell in TS 38.331 [5].

Special Cell

For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention based Random Access, and is always activated.

Channel State Information

UE provides CSI to GNB via PUCCH or PUSCH. UE measures, according to GNB's instruction, certain time/frequency resource and report the result of the measurement in the form of CSI. CSI reporting can be either Persistent or Semi-persistent CSI Reporting Configuration CSI reporting configuration for Persistent CSI reporting (P-CSI reporting configuration) consists with following information: CSI-RS id for CSI-RS to be measured, CSI-RS reporting resource (in the form of index indicating periodically allocated PUCCH time/frequency resource in the corresponding/associated UL BWP), CSI-RS reporting format (in the form of index indicating the size of CSI report)

CSI reporting configuration for Semi Persistent CSI reporting (SP-CSI reporting configuration) consists with following information: CSI-RS id for CSI-RS to be measured, CSI-RS reporting resource (in the form of index indicating periodically allocated PUCCH time/frequency resource in the corresponding/associated UL BWP), CSI-RS reporting format (in the form of index indicating the size of CSI report)

SP-CSI REPORTING A/D MAC CE

The SP-CSI REPORTNG Activation/Deactivation MAC CE is identified by a MAC PDU subheader with a specific LCID It has a configurable size of 8 bits, 16 bits or 32 bits with following fields:

$S_i$: if there is an SP-CSI report configuration configured with CSI-ReportConfigId i for the active UL BWP of SpCell or PUCCH SCell, this field indicates the activation/deactivation status of the SP-CSI report configuration with CSI-ReportConfigId i, otherwise the MAC entity shall ignore the $S_i$ field. The $S_i$ field is set to "1" to indicate that the SP-CSI report configuration with CSI-ReportConfigId i of UL relevant UL BWP of relevant serving cell shall be activated. The Si field is set to "0" to indicate that the SP-CSI report configuration with CSI-ReportConfigId i shall be deactivated.

The size of SP-CSI REPORTING A/D is determined by the highest CSI-ReportConfigId of the corresponding serving cell. The corresponding serving cell is either PUCCH SCell (if SP-CSI REPORTING A/D MAC CE is received in DL BWP of serving cell of Secondary PUCCH CG) or SpCell (if SP-CSI REPORTING A/D MAC CE is received in DL BWP of serving cell of Primary PUCCH CG).

The relevant serving cell is PUCCH SCell if SP-CSI REPORTING A/D MAC CE is received in DL BWP of serving cell of Secondary PUCCH CG and SpCell if SP-CSI REPORTING A/D MAC CE is received in DL BWP of serving cell of Primary PUCCH CG.

The relevant UL BWP is the active UL BWP of the relevant serving cell. If multiple UL BWPs are active, UL BWP of the uplink configured with PUCCH is the relevant UL BWP.

Meanwhile, the method and apparatus to receive and transmit data in a mobile communication system according to various exemplary embodiments of the present invention described above may be implemented in an installation data form and be provided in servers or devices in a state in which it is stored in various non-transitory computer readable media. Therefore, the respective apparatuses may access the servers or the devices in which the installation data are stored to download the installation data.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

ABBREVIATION

AM DRB Acknowledged Mode Data Radio Bearer
ARFCN Absolute Radio Frequency Channel Number
BS Buffer Status
BSR Buffer Status Report
BWP Bandwidth Part
CCCH Common Control Channel
CR Contention Resolution
C-RNTICell Radio Network Temporary Identifier
DCI Downlink Control Information
DL Downlink
DRX Discontinuous Reception
eMBB enhanced Mobile Broadband
E-UTRAN Evolved Universal Terrestrial Radio Access Network
FB Frequency Band
FBG Frequency Band Group
FBI Frequency Band Indicator
FMC First Missing Count
GNB next Generation Node B
HARQ Hybrid Automatic Retransmission reQuest
HO Handover
LCH Logical Channel
LCID Logical Channel ID
LCP Logical Channel Prioritization
MAC Medium Access Control
MAC CE MAC Control Element
MCS Modulation Coding Scheme
MeNB Master eNode B
MME Mobility Management Entity
MSB Most Significant Bit
MSI Minimum System Information
NR Next Radio
PCell Primary Cell
PDCCH Physical Downlink Control Channel
PDCP Packet Data Convergence Protocol
PDSCH Physical Downlink Shared Channel
PDU Protocol Data Unit
PRB Physical Resource Block
PSS/SSS Primary Synchronization Signal/Secondary Synchronization Signal
PUCCH Physical Uplink Control Channel
PUCCH CG PUCCH Cell GroupPUSCH Physical Uplink Shared Channel
RA Random Access
RACH Random Access Channel
RAR Random Access Response
RA-RNTI Random Access Radio Network Temporary Identifier
RAPID Random Access Preamble Identifier
RAT Radio Access Technology
RB Radio Bearer
RLC Radio Link Control
RLF Radio Link Failure
RMSI Remaining Minimum System Information
RRC Radio Resource Control
RSRP/RSRQ Reference Signal Received Power/Reference Signal Received Quality
RTT Round Trip Time
RV Redundancy Version
Scell Secondary cell
SCS Sub Carrier Spacing
SDAP Service Data Adaptation Protocol
SDU Service Data Unit
SgNB Secondary gNode B
SIB System Information Block
SIBG System Information Block Group
SPS Semi-Persistent Scheduling
SRB Signaling Radio Bearer
SRS Sounding Reference Signal
S-TMSI SAE-Temporary Mobile Subscriber Identity
SUL Supplemental Uplink
TA Timing Advance
TAC Timing Advance Command
TB Transport Block
TTI Transmission Time Interval
UE User Equipment; interchangeable with Terminal
UL Uplink
UM DRB Unacknowledged Mode Data Radio Bearer
URLLC Ultra Reliable Low Latency

What is claimed is:

1. A method by a terminal, the method comprising:
generating a 1st MAC (Medium Access Control) subPDU (sub Protocol Data Unit) for a 1st CCCH (Common Control Channel) SDU (Service Data Unit) by attaching a 1st type MAC subheader;
generating a 1st MAC PDU (Protocol Data Unit) including the 1st MAC subPDU; and
transmitting, to a base station, the 1st MAC PDU;
receiving, from the base station, a 2nd MAC PDU including a 2nd MAC subPDU for a 2nd CCCH SDU,
wherein the $2^{nd}$ MAC subPDU includes a $2^{nd}$ type MAC subheader,
wherein the 1st type MAC subheader is used for transmitting the 1st CCCH SDU and the 2nd type MAC subheader is used for receiving the 2nd CCCH SDU,
wherein the 1st type MAC subheader includes a six bit LCID (Logical Channel ID) field indicating both that logical channel instance of a corresponding MAC SDU is a CCCH and that a size of the corresponding MAC SDU is either a first value or a second value,
wherein the 2nd type MAC subheader includes an LCID field indicating logical channel instance of a corresponding MAC SDU is a CCCH and an L field indicating a size of the corresponding MAC SDU,
wherein the LCID of the $1^{st}$ type MAC subheader is set to a third value based on the corresponding MAC SDU being a CCCH SDU and the size of the corresponding MAC SDU being the first value,
wherein the LCID of the $1^{st}$ type MAC subheader is set to a fourth value based on the corresponding MAC SDU being a CCCH SDU and the size of the corresponding MAC SDU being the second value, and
wherein the third value is 000000 and the fourth value is different from the third value.

2. A terminal in a wireless communication system, the terminal comprising:
a transceiver configured to transmit and receive a signal; and
a controller configured to control the transceiver to:
generate a 1st MAC (Medium Access Control) subPDU (sub Protocol Data Unit) for a 1st CCCH (Common Control Channel) SDU (Service Data Unit) by attaching a 1st type MAC subheader;
generate a 1st MAC PDU (Protocol Data Unit) including the 1st MAC subPDU;
transmit, to a base station, the 1st MAC PDU; and
receive, from the base station, a 2nd MAC PDU including a 2nd MAC subPDU for a 2nd CCCH SDU, wherein the $2^{nd}$ MAC subPDU includes a $2^{nd}$ type MAC subheader, wherein the 1st type MAC subheader is used for transmitting the 1st CCCH SDU and the 2nd type MAC subheader is used for receiving the 2nd CCCH SDU, wherein the 1st type MAC subheader includes a six bit LCID (Logical Channel ID) field indicating both that logical channel instance of a corresponding MAC SDU is a CCCH and that a size of the corresponding MAC SDU is either a first value or a second value, wherein the 2nd type MAC subheader includes an LCID field indicating logical channel instance of a corresponding MAC SDU is a CCCH and an L field indicating a size of the corresponding MAC SDU, wherein the LCID of the $1^{st}$ type MAC subheader is set to a third value based on the corresponding MAC SDU being a CCCH SDU and the size of the corresponding MAC SDU being the first value, wherein the LCID of the $1^{st}$ type MAC subheader is set to a fourth value based on the corresponding MAC SDU being a CCCH SDU and the size of the corresponding MAC SDU being the second value, and wherein the third value is 000000 and the fourth value is different from the third value.

\* \* \* \* \*